(12) United States Patent
Borak et al.

(10) Patent No.: US 12,088,571 B2
(45) Date of Patent: Sep. 10, 2024

(54) SYSTEM AND METHODS OF DETERMINING AND MANAGING PROBES IN A MULTI-HOP NETWORK

(71) Applicant: CACI, Inc.—Federal, Arlington, VA (US)

(72) Inventors: John A. Borak, Glen Ridge, NJ (US);
Eric W. Hsiung, Providence, RI (US);
Michael J. Chen, Livingston, NJ (US)

(73) Assignee: CACI, Inc.—Federal, Reston, VA (US)

( * ) Notice: Subject to any disclaimer, the term of this patent is extended or adjusted under 35 U.S.C. 154(b) by 158 days.

(21) Appl. No.: 17/460,696

(22) Filed: Aug. 30, 2021

(65) Prior Publication Data

US 2022/0078171 A1 Mar. 10, 2022

Related U.S. Application Data

(60) Provisional application No. 63/074,688, filed on Sep. 4, 2020.

(51) Int. Cl.
*H04L 29/06* (2006.01)
*H04L 9/40* (2022.01)

(52) U.S. Cl.
CPC ...... *H04L 63/0485* (2013.01); *H04L 63/0236* (2013.01); *H04L 63/0464* (2013.01); *H04L 63/166* (2013.01)

(58) Field of Classification Search
CPC ............. H04L 63/0485; H04L 63/0236; H04L 63/0464; H04L 63/166; H04L 63/0272; H04L 63/0471
See application file for complete search history.

(56) References Cited

U.S. PATENT DOCUMENTS

| | | | | |
|---|---|---|---|---|
| 6,711,264 | B1* | 3/2004 | Matsumoto | H04L 9/14 380/283 |
| 6,898,577 | B1* | 5/2005 | Johnson | G06Q 30/02 705/317 |
| 10,771,489 | B1* | 9/2020 | Bisht | G06N 20/00 |
| 11,349,861 | B1* | 5/2022 | Costlow | H04L 43/08 |
| 2006/0251258 | A1* | 11/2006 | Lillie | H04L 63/062 380/270 |
| 2007/0226630 | A1 | 9/2007 | Farid et al. | |
| 2008/0091803 | A1 | 4/2008 | Liu | |
| 2008/0109871 | A1* | 5/2008 | Jacobs | H04L 63/20 726/1 |

(Continued)

OTHER PUBLICATIONS

Cai et al., "Touching from a Distance: Website Fingerprinting Attacks and Defenses, Touching from a distance: website fingerprinting attacks and defenses", Computer-Communication Networks, 2012, pp. 605-616.

*Primary Examiner* — Khalid M Almaghayreh
(74) *Attorney, Agent, or Firm* — BakerHostetler

(57) ABSTRACT

The present application describes a method including one or more steps. One step of the method includes receiving, at a gateway including an encrypted pathway, traffic from a third party originating outside a multi-hop network intended for a client inside the network. Another step of the method includes determining, using a trained machine learning model, a probe of the received traffic attempting to obtain confidential information about the multi-hop network. Yet another step of the method includes flagging the third party based on determined probe.

16 Claims, 21 Drawing Sheets

(56) References Cited

U.S. PATENT DOCUMENTS

| | | | |
|---|---|---|---|
| 2013/0086378 A1* | 4/2013 | Yao | H04L 63/0281 |
| | | | 713/156 |
| 2013/0315391 A1* | 11/2013 | Yao | H04L 63/0428 |
| | | | 380/255 |
| 2017/0171169 A1* | 6/2017 | Lee | H04W 12/033 |
| 2018/0255060 A1* | 9/2018 | Bansal | H04L 67/51 |
| 2019/0335324 A1* | 10/2019 | Ringland | H04L 61/5007 |
| 2021/0037035 A1* | 2/2021 | Graul | G06F 21/552 |
| 2021/0168117 A1* | 6/2021 | Iapalucci | G06N 3/08 |
| 2021/0194928 A1 | 6/2021 | Halford | |
| 2022/0053022 A1* | 2/2022 | Wu | H04L 43/08 |
| 2022/0094706 A1* | 3/2022 | Higgins | H04L 63/0807 |
| 2022/0116416 A1* | 4/2022 | Borak | H04L 63/1425 |

* cited by examiner

500

| Admin Dashboard | ⚙Account ⏻Logout |
|---|---|
| System Status ♥ | Create New VPN |
| Users ⑧ | Name |
| Groups 👥 | [Multi Hop VPN] |
| VPN 🛡 | Subdomain |
| Firewall 🔒 | [ ] |

Size
[Default ▾]

Server
◉ Private
○ Public

Types
◉ Dynamic
○ Static

Rotation Period
[ ]

Diffie-Hellman Rotation
[ ]

Protocol
◉ UDP
○ TCP

Port
[1080]

Custom ODR
[ ]

Cloud Provider
[Amazon ▾]

Region
[North America ▾]

DataCenter
[US-west-1 ▾]

Hop #1   [Delete Hop]

Name
[                              ]

Subdomain
[                              ]

Size
[Default                     ▾]

Scope
◉ Dynamic
○ Static

Type
◉ Dynamic
○ Static

Rotation Period
[                              ]

Diffie-Hellman Rotation
[                              ]

Types Protocol
◉ UDP
○ TCP

Port
[1080                          ]

Custom ODR
[                              ]

Cloud Provider
[amazon                      ▾]

Region
[North America              ▾]

DataCenter
[US-west-2                   ▾]

[Add VPN Hop] [Create]

FIG. 5B

Admin Dashboard ✱ Account ● Logout

System Status ●
Users ⊗
Groups ♣
VPN ⊕
John Doe
All
Firewall 🔒

| | Create VPN | Rotate | Stop | Start | | Item View ▸ |
|---|---|---|---|---|---|---|
| ☐ | Name | State | Address | Hostname | Geo |
| ☐ | Multi Hop VPN udp:1080 | Running | Public: 54.153.66.28 Private: 172.31.15.209 | 16665350.beta.tangoprivacy.com | |
| ☐ | Multi Hop VPN Hop #1 udp:1080 | Running | Public: 34.217.61.85 Private: 172.31.29.251 | 87454603.beta.tangoprivacy.com | |
| ☐ | Set A udp:1080 | Running | Public: 54.151.89.198 Private: 172.31.15.173 | 95038386.beta.tangoprivacy.com | |
| ☐ | Set B udp:1080 | Running | Public: 54.176.225.248 Private: 172.31.7.181 | 4155150.beta.tangoprivacy.com | |
| ☐ | Set C udp:1080 | Running | Public: 13.52.239.46 Private: 172.31.15.19 | 14323526.beta.tangoprivacy.com | |
| ☐ | Set D udp:1080 | Stopped | | 49901580.beta.tangoprivacy.com | |
| ☐ | Set E udp:1080 | Stopped | | 7347907.beta.tangoprivacy.com | |
| ☐ | Test Hops udp:1080 | Stopped | | 65994003.beta.tangoprivacy.com | |
| ☐ | Test Hops Hop #1 udp:1080 | Stopped | | 87972609.beta.tangoprivacy.com | |
| ☐ | Test Hops Hop #2 udp:1080 | Stopped | | 40364061.beta.tangoprivacy.com | |

FIG. 6

Gateway Status Configuration Events Users Backup System        Help admin ▾

Status [RUNNING]

Interface Status eno1 [good]
10.0.0.156/24 eno4 [good]
192.168.1.1/24

VPN Group Status

| ▾ | VPNs |
|---|---|
| ▸ [CONNECTED] | client-9244236679-27335039.tangoprivacy.com.ovpn |
| Server | 18.189.141.148:1080 |
| Tun Interface | tun0 |
| Bytes | 22.5 MB ⇩ / 34.1 MB ⇧ |
| ▴ [CONNECTED] | client-986820248-3060458.tangoprivacy.com.ovpn |
| ▴ [CONNECTED] | set1vpn5.21327846.tangoprivacy.com.ovpn |
| ▴ [CONNECTED] | set1vpn4.909465.tangoprivacy.com.ovpn |
| Server | 34.72.86.7:443 |
| Tun Interface | tun3 |
| Bytes | 29.3 MB ⇩ / 39.4 MB ⇧ |
| ▴ [CONNECTED] | set1vpn3.91306986.tangoprivacy.com.ovpn |
| ▴ [CONNECTED] | set1vpn2.63651389.tangoprivacy.com.ovpn |
| ▴ [CONNECTED] | set1vpn1.11029566.tangoprivacy.com.ovpn |

Active users:admin

Admin Dashboard

System Status
Users
Groups
VPN
John Doe
All
Firewall

Private
Stop | Client static-udp-secure-tunnel-test
PORTLAND, OREGON
Internet Address
Udp(52.89.99.167:1080)
Private Address
172.31.16.158
Hostname
24281522.tangoprivacy.com
Status
Running
Private
Stop | Client tcp vpn for testing
Internet Address
tcp[34.69.53.241:443]
Private Address
10.128.0.23
Hostname
8605085.tangoprivacy.com
Status
Running
Private
Stop | Client Account  Logout

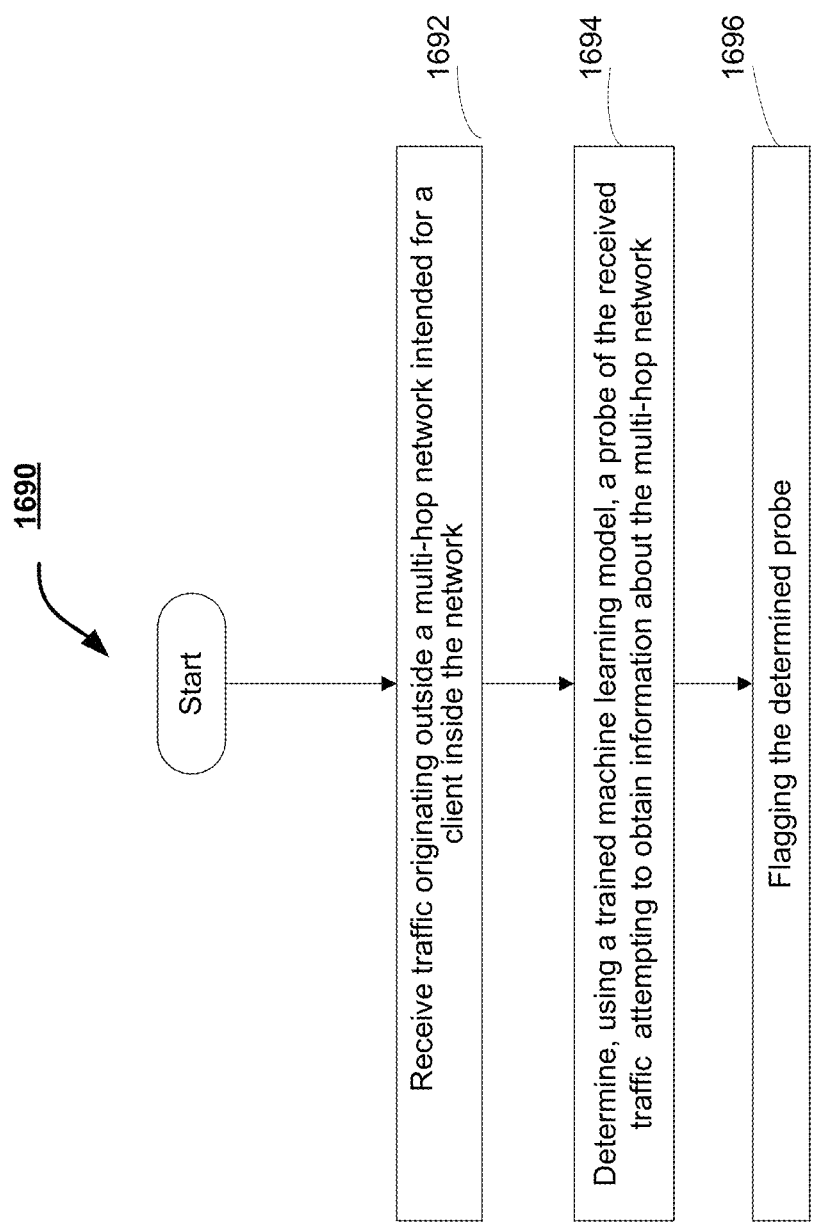

SYSTEM AND METHODS OF DETERMINING AND MANAGING PROBES IN A MULTI-HOP NETWORK

CROSS-REFERENCE TO RELATED APPLICATIONS

This application claims the benefit of priority of U.S. Provisional Application No. 63/074,688 filed Sep. 4, 2020, the contents of which is incorporated by reference in its entirety herein.

FIELD

This application is generally directed to methods and systems of determining a probe from a third party attempting to obtain information about a multi-hop network.

BACKGROUND

Traditional network defenses examine the source of network traffic and subsequently enforce a policy. The policy may include firewalls to allow or refuse traffic. These rules are managed by a network security administrator.

Third party probes or attacks may result from covert monitoring of interactions among nodes or based upon application requests. For example, third parties may employ deep packet inspection at the perimeter of the network. Third parties may also attempt to locate source Internet Protocol (IP) addresses used across nodes in the multi-hop network. The information potentially obtained by third parties may result in confidential information being exposed.

Sophisticated probing or attacks by third parties may also be deployed by using different IP addresses spaced out over a frequency of transmission. Third parties may also employ different protocols in an attempt to discover partial connections between nodes. Separately, knowledge about a specific node in the multi-hop network may also be gained based upon intelligence covertly obtained on another node in the multi-hop network. For example, this may occur when a shared SSH key is used by the network administrator to connect to each node during initial setup or maintenance.

What may be desired in the art is an apparatus, system, method and/or algorithm employing machine learning to determine third party probes or attacks in a multi-hop network.

What may also desired is an apparatus, system, method and/or algorithm for presenting a simple user-interface to help monitor, flag and update policies regarding determined probes in a multi-hop network.

SUMMARY

The foregoing needs are met, to a great extent, by the disclosed apparatus, system and method for providing network diversification and secure communications.

One aspect of the application may be directed to a method including one or more steps. One step of the method may include receiving, at a gateway including an encrypted pathway, traffic from a third party originating outside a multi-hop network intended for a client inside the network. Another step of the method may include determining, using a trained machine learning model, a probe of the received traffic attempting to obtain confidential information about the multi-hop network. Yet another step of the method may include flagging the third party based on determined probe.

Another aspect of the application may be directed to a system which includes a non-transitory memory including a set of instructions. The system also includes a processor operably coupled to the non-transitory memory configured to execute the set of instructions. The set of instructions may include receiving, at a gateway including an encrypted pathway, traffic from a third party originating outside a multi-hop network intended for a client inside the network. The set of instructions may also include determining, via a trained machine learning model, a probe of the received traffic attempting to obtain information about the network. The set of instructions may further include updating, based on the determined probe, a dynamic mode policy of an encrypted pathway supporting the client.

Yet even another aspect of the application may be directed to a computer readable storage medium (CRM). The CRM may include an executable set of instructions which when executed by a processor effectuate the set of instructions. For example, the CRM may effectuate the instructions of receiving traffic originating outside a multi-hop network intended for a client inside the network. The CRM may also effectuate the instructions of determining, using a trained machine learning model, a probe of the received traffic attempting to obtain information about the multi-hop network. The CRM may further effectuate the instructions of flagging the determined probe.

There has thus been outlined, rather broadly, certain embodiments in order that the detailed description thereof herein may be better understood, and in order that the present contribution to the art may be better appreciated. There are, of course, additional embodiments of the invention that will be described below and which will form the subject matter of the claims appended hereto.

BRIEF DESCRIPTION OF THE DRAWINGS

In order to facilitate a fuller understanding of the invention, reference is now made to the accompanying drawings, in which like elements are referenced with like numerals. These drawings should not be construed as limiting the invention and intended only to be illustrative.

FIG. 5A illustrates another administrative UI depicting the creation of an encrypted pathway for supporting traffic flow to a destination according to an aspect of the application.

FIG. 5B illustrates yet another administrative UI depicting a first hop of the created encrypted pathway according to an aspect of the application.

FIG. 6 illustrates yet another administrative UI of the architecture according to an aspect of the application.

FIG. 7 illustrates a further administrative UI for monitoring the interface status of plural VPNs according to an aspect of the application.

FIG. 8 illustrates yet even a further administrative UI indicating testing of the created VPNs according to an aspect of the application.

FIG. 16C illustrates a further flow depicting functionality for determining a probe according to an aspect of the application.

DETAILED DESCRIPTION

Figure 1A:
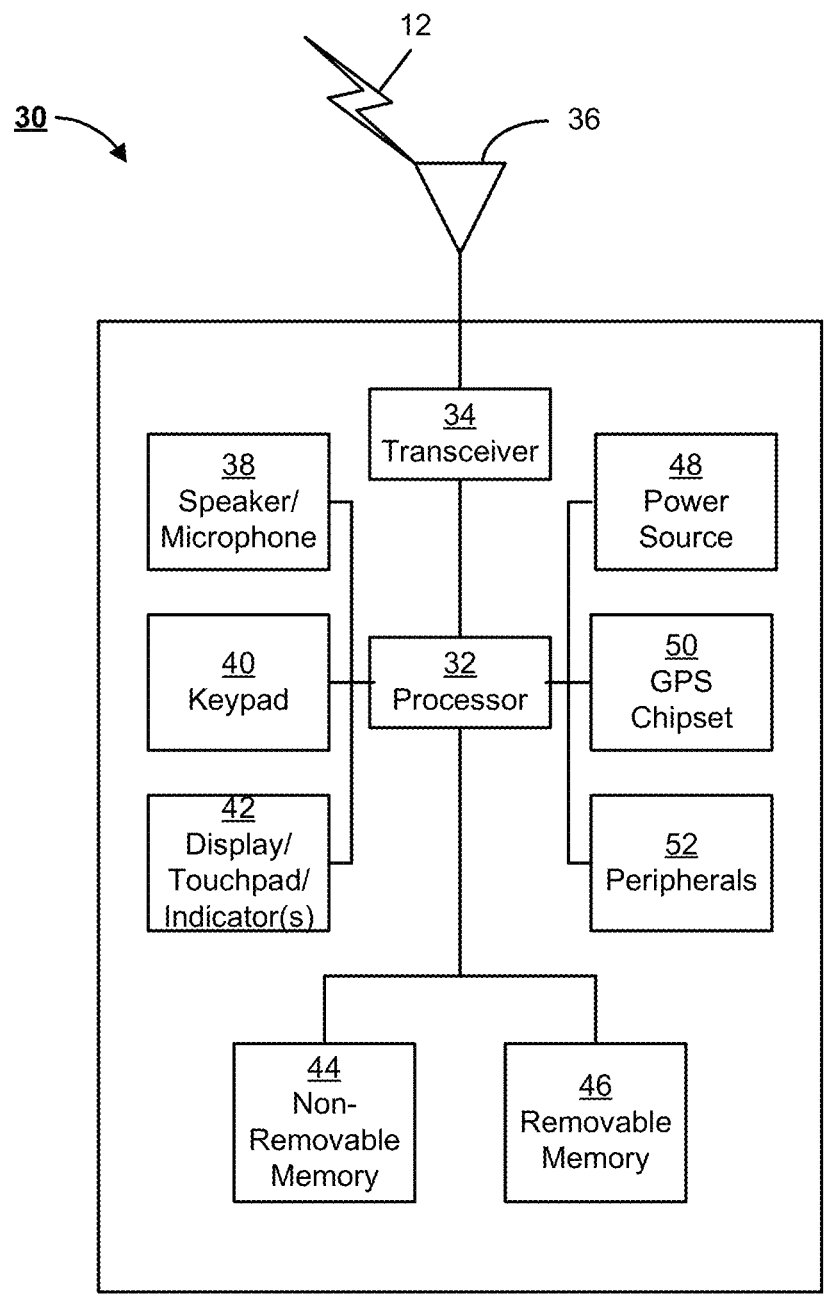
FIG. 1A illustrates an exemplary hardware/software architecture according to an aspect of the application.

In this respect, before explaining at least one embodiment of the invention in detail, it is to be understood that the invention is not limited in its application to the details of construction and to the arrangements of the components set forth in the following description or illustrated in the drawings. The invention is capable of embodiments or embodiments in addition to those described and of being practiced and carried out in various ways. Also, it is to be understood that the phraseology and terminology employed herein, as well as the abstract, are for the purpose of description and should not be regarded as limiting.

Reference in this application to "one embodiment," "an embodiment," "one or more embodiments," or the like means that a particular feature, structure, or characteristic described in connection with the embodiment is included in at least one embodiment of the disclosure. The appearances of, for example, the phrases "an embodiment" in various places in the specification are not necessarily all referring to the same embodiment, nor are separate or alternative embodiments mutually exclusive of other embodiments. Moreover, various features are described which may be exhibited by some embodiments and not by the other. Similarly, various requirements are described which may be requirements for some embodiments but not by other embodiments.

In an aspect, it has been determined and exemplarily described in the application that the functionality at the gateway improves network diversification and security from third party probing and attacks. In one embodiment, complex networks may be presented on an administrator UI. The UI may be a simple representation that helps manage network traffic flowing through one or more encrypted pathways. The logical networks overlay outbound physical networks operated by ISPs. These logical networks are configured to be dynamic, e.g., constantly changing, and managed in the background. The logical networks employ encryption protocols such as for example, one or more of OpenVPN, IPsec, SSH, and Tor.

As will be described and supported in this application, logical networks including encryption protocols may be understood to be synonymous with the phrase encrypted pathways. Importantly, the encrypted pathways may include multiple hops. The multiple hops may have the capability of varying protocols and points of presence to obfuscate traffic on the network. The functionality makes it difficult, and thus cost prohibitive, for third parties to observe and trace browsing history to a particular client.

In one embodiment, the architecture may provide administrators with the ability only to configure protocols once. In other words, constant oversight of the protocols may be unnecessary. This results in a robust level of obfuscation for a large group of clients' identities and locations on the network.

In another embodiment, the architecture may provide the administrator or owner/operator of the smart gateway with options to collect spatial-temporal data from monitoring traffic flow. The options allow the administrator to collect data regarding certain types of traffic flow. For example, the administrator may wish to collect data of all HTTP and HTTPs traffic requests from clients versus other traffic types such as FTP. The options also allow the administrator to collect data regarding specific clients.

In yet another embodiment, the system architecture may include a cloud orchestration platform. The cloud orchestration platform provides programmatic creation and management of virtual machines across a variety of public and private cloud infrastructure. Moreover, the cloud orchestration platform may enable privacy-focused system design and development.

The cloud orchestration platform may offer uniform and simple mechanisms for dynamically creating infrastructure that hosts a variety of solutions. Exemplary solutions may include networks that provide secure and/or obfuscated transport. The solutions may include a dynamic infrastructure that is recreated and continuously moved across the Internet. The solutions also offer the ability to host independent applications or solutions.

Computer Architecture

FIG. 1A is a block diagram of an exemplary hardware/software architecture of a node 30 of a network, such as clients, servers, or proxies, which may operate as a server, gateway, device, or other node in a network. The node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. The node 30 may include any sub-combination of the foregoing elements while remaining consistent with an embodiment.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node 30 in order to perform the various required functions of the node 30. For example, the processor 32 may perform signal coding, data processing, power control, input/output processing, and/or any other functionality that enables the node 30 to operate in a wireless or wired environment. The processor 32 may run application-layer programs (e.g., browsers) and/or radio-access-layer (RAN) programs and/or other communications programs. The processor 32 may also perform security operations, such as authentication, security key agreement, and/or cryptographic operations. The security operations may be performed, for example, at the access layer and/or application layer.

Figure 1B:
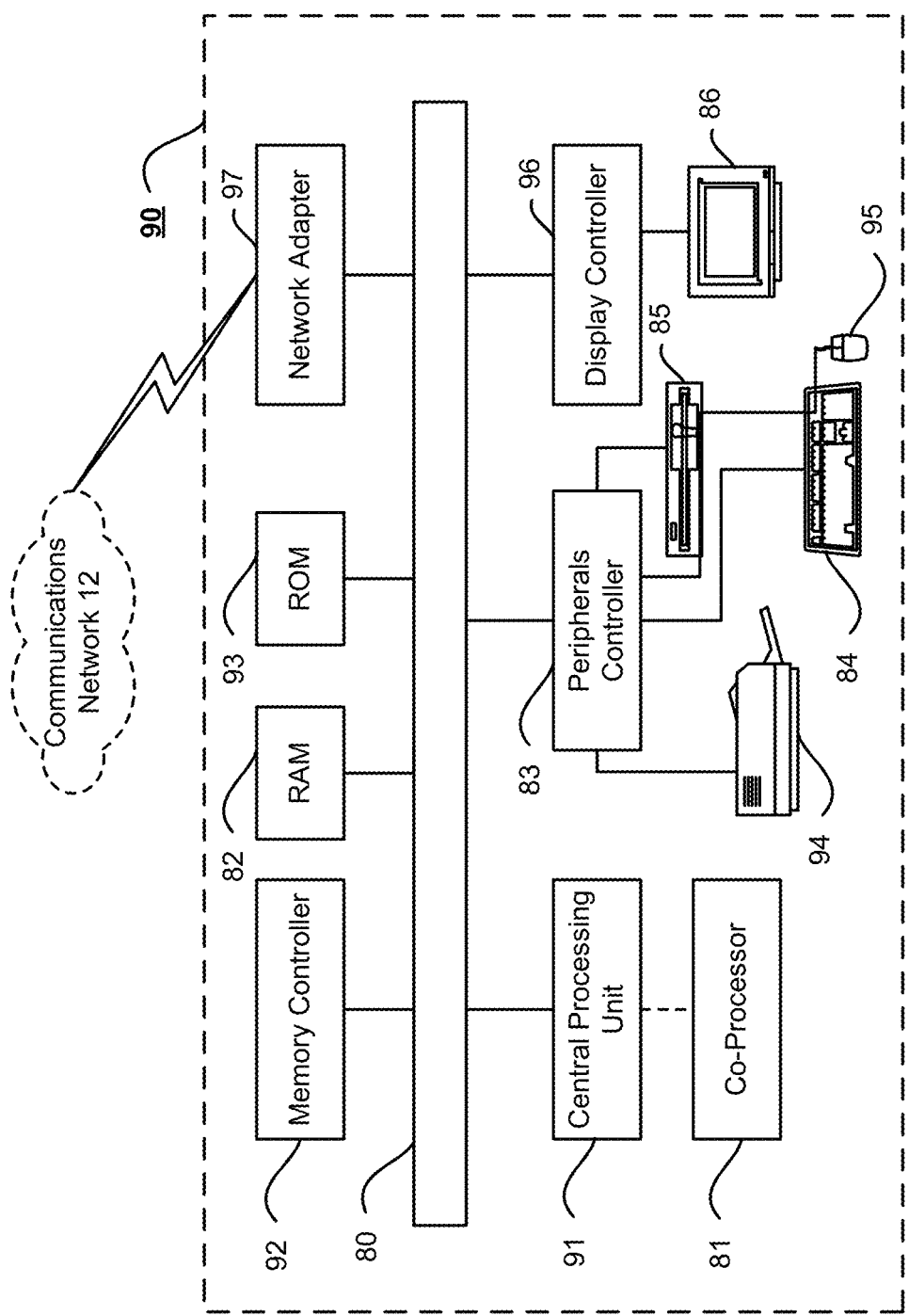
FIG. 1B illustrates an exemplary computing system according to an aspect of the application.

As shown in FIG. 1A, the processor 32 is coupled to its communication circuitry (e.g., transceiver 34 and transmit/receive element 36). The processor 32, through the execution of computer-executable instructions, may control the communication circuitry to cause the node 30 to communicate with other nodes via the network to which it is connected. While FIG. 1B depicts the processor 32 and the transceiver 34 as separate components, the processor 32 and the transceiver 34 may be integrated together in an electronic package or chip.

The transmit/receive element 36 may be configured to transmit signals to, or receive signals from, other nodes, including servers, gateways, wireless devices, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. The transmit/receive element 36 may be configured to transmit and/or receive any combination of wireless or wired signals.

In addition, although the transmit/receive element 36 is depicted in FIG. 1A as a single element, the node 30 may include any number of transmit/receive elements 36. More specifically, the node 30 may employ multiple-input and multiple-output (MIMO) technology. Thus, in an embodiment, the node 30 may include two or more transmit/receive elements 36 (e.g., multiple antennas) for transmitting and receiving wireless signals.

The transceiver 34 may be configured to modulate the signals to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as Universal Terrestrial Radio Access (UTRA) and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer.

The processor 32 may receive power from the power source 48 and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. The node 30 may acquire location information by way of any suitable location-determination method while remaining consistent with an embodiment.

The processor 32 may further be coupled to other peripherals 52, which may include one or more software and/or hardware modules that provide additional features, functionality, and/or wired or wireless connectivity. For example, the peripherals 52 may include various sensors such as an accelerometer, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, an Internet browser, and the like.

The node 30 may also be embodied in other apparatuses or devices. The node 30 may connect to other components, modules, or systems of such apparatuses or devices via one or more interconnect interfaces, such as an interconnect interface that may comprise one of the peripherals 52.

FIG. 1B is a block diagram of an exemplary computing system 90 that may be used to implement one or more nodes (e.g., clients, servers, or proxies) of a network, and which may operate as a server, gateway, device, or other node in a network. The computing system 90 may comprise a computer or server and may be controlled primarily by computer-readable instructions, which may be in the form of software, by whatever means such software is stored or accessed. Such computer-readable instructions may be executed within a processor, such as a central processing unit (CPU) 91, to cause the computing system 90 to effectuate various operations. In many known workstations, servers, and personal computers, the CPU 91 is implemented by a single-chip CPU called a microprocessor. In other machines, the CPU 91 may comprise multiple processors. A co-processor 81 is an optional processor, distinct from the CPU 91 that performs additional functions or assists the CPU 91.

In operation, the CPU 91 fetches, decodes, executes instructions, and transfers information to and from other resources via the computer's main data-transfer path, a system bus 80. Such a system bus 80 connects the components in the computing system 90 and defines the medium for data exchange. The system bus 80 typically includes data lines for sending data, address lines for sending addresses, and control lines for sending interrupts and for operating the system bus 80. An example of such a system bus 80 is the PCI (Peripheral Component Interconnect) bus.

Memories coupled to the system bus 80 include RAM 82 and ROM 93. Such memories include circuitry that allows information to be stored and retrieved. The ROM 93 generally contains stored data that cannot easily be modified.

Data stored in the RAM 82 may be read or changed by the CPU 91 or other hardware devices. Access to the RAM 82 and/or the ROM 93 may be controlled by a memory controller 92. The memory controller 92 may provide an address translation function that translates virtual addresses into physical addresses as instructions are executed. The memory controller 92 may also provide a memory protection function that isolates processes within the system and isolates system processes from user processes. Thus, a program running in a first mode may access only memory mapped by its own process virtual address space. It cannot access memory within another process's virtual address space unless memory sharing between the processes has been set up.

In addition, the computing system 90 may contain a peripherals controller 83 responsible for communicating instructions from the CPU 91 to peripherals, such as a printer 94, a keyboard 84, a mouse 95, and a disk drive 85.

A display 86, which is controlled by a display controller 96, is used to display visual output generated by the computing system 90. Such visual output may include text, graphics, animated graphics, and video. The display 86 may be implemented with a CRT-based video display, an LCD-based flat-panel display, gas plasma-based flat-panel display, or a touch-panel. The display controller 96 includes electronic components required to generate a video signal that is sent to the display 86.

Obfuscating Network Traffic

According to another aspect of the application, an architecture may secure and anonymize client traffic. Specifically, a smart gateway may obfuscate network traffic received from clients on a network intended for the world wide web, a satellite network, or a cloud server. Network traffic may be spatially and temporally diversified across numerous transport tunnels based on plural criteria.

The architecture may offer customized options for entities of all sizes to secure and privatize communications. In an exemplary embodiment, one or more network security client protocols running at the smart gateway is connected to a server. Namely, an encrypted pathway, e.g., tunnel, is established between the network security client protocols and a sever to encrypt data flowing therethrough. This presents the data as unreadable to anyone outside the encrypted pathway. Namely, the encrypted pathway hides the IP address and geo-location of the client and replaces it with another address.

The network security client protocols may include for example, one or more of OpenVPN, IPsec, SSH, and TOR, to encrypt network traffic. Upon receipt by the associated server, the data is decrypted and may subsequently be forwarded to a web server hosting a web page. Alternatively, the decrypted data may be sent to a cloud sever. In an exemplary embodiment and as envisaged in this application, any network security client protocols discussed above may be broadly described as a VPN client and the associated server receiving the encrypted data may be broadly described as a VPN server unless specifically limited to a particular protocol.

Figure 2:
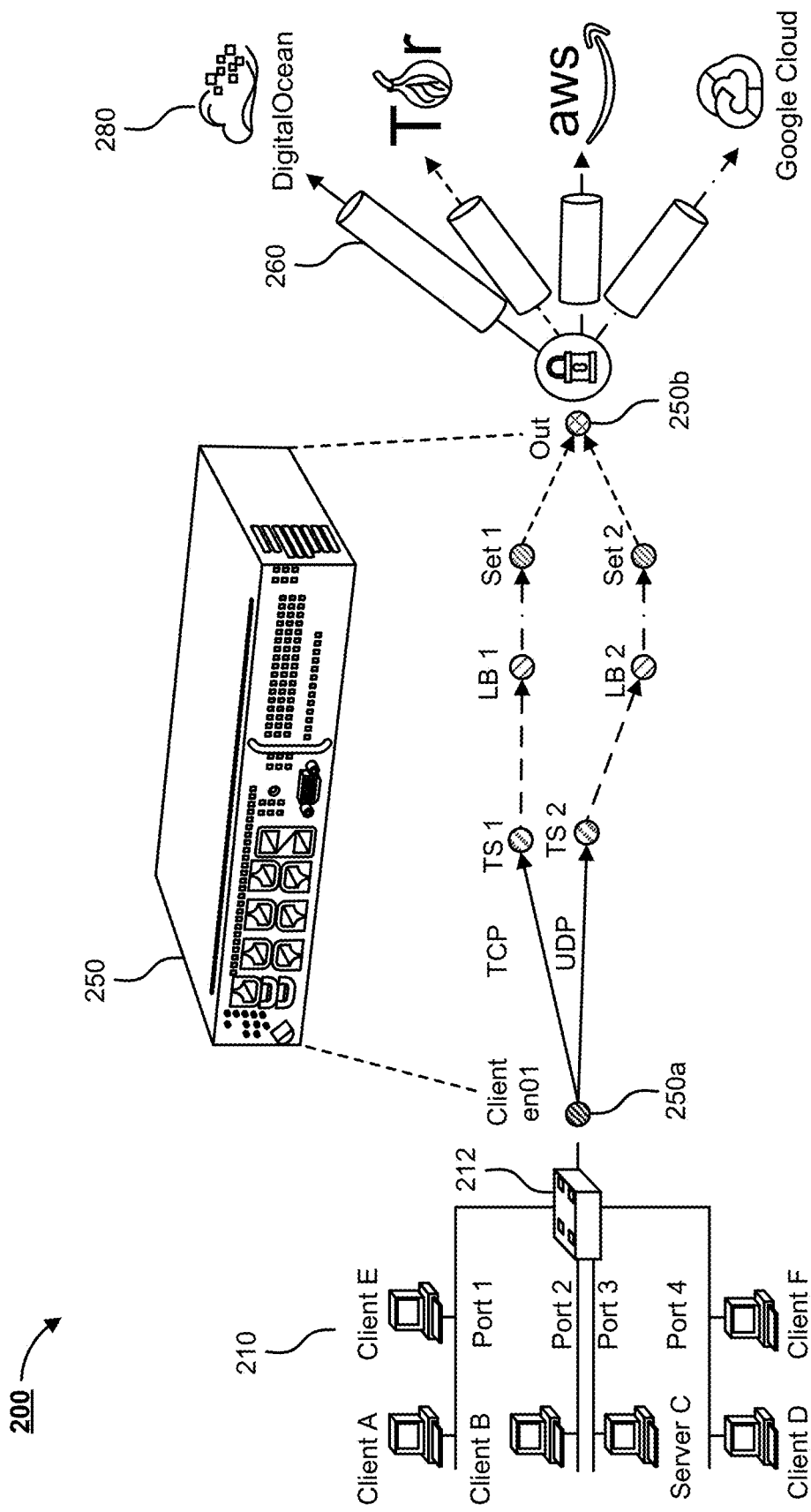
FIG. 2 illustrates an exemplary system level view of the architecture according to an aspect of the application.

In an embodiment, FIG. 2 depicts a system architecture 200 including an network 210 connected to a smart gateway 250. The network includes plural clients connected via ports to a home or local router 212. Traffic from the home router 212 is received at an input 250a of the smart gateway 250. The obfuscation techniques and functionality occurring, or causing to occur remotely, at the smart gateway 250 will be discussed in more detail below with respect to FIGS. 3 and 4.

Obfuscated network traffic based on one or more security criteria exits an output 250b of the smart gateway 250 and is transported via one or more encrypted pathways to a destination. As shown in FIG. 2, the destination may include one or more cloud servers operated by a cloud service provider (CSP). The cloud servers may include one or more of DigitalOcean, Tor, AWS and Google Cloud.

Figure 3:
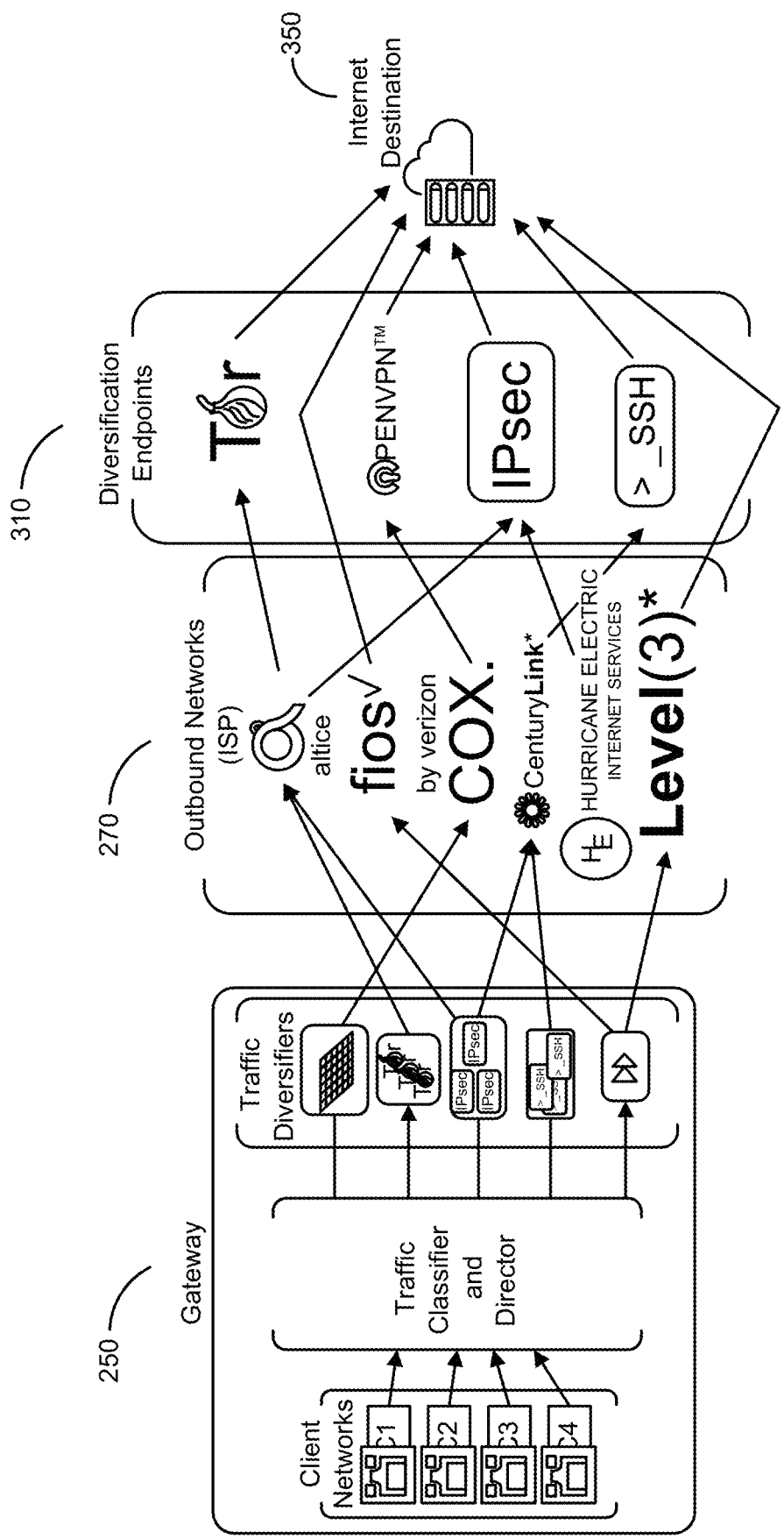
FIG. 3 illustrates traffic and encrypted pathway diversification functionality of the architecture in FIG. 2 according to an aspect of the application.

In a further embodiment as depicted in FIG. 3, the functionality within the smart gateway 250 is described. Specifically, the smart gateway 250 operates as a traffic classifier and director of received traffic from one or more client networks. These client networks may be understood to represent components within the network 210 depicted in FIG. 2. Here, the client network illustrates four clients transmitting traffic to the smart gateway 250.

In an exemplary embodiment, the smart gateway 250 determines a protocol type and source IP address of the received traffic. For example, when a user requests a web page composed of resources from several different web servers (i.e., main content, advertising network content, content delivery network (CDN) content, cross-site resources, etc.), the request for each resource on these servers is made across different logical links. In other words, separate connections are made to each respective server with a different security protocol. To an observing webmaster, several different source locations (IP addresses) are utilized for loading the complete content of the web page.

Next, the network security protocol is configured and employed to support traffic based on a specific protocol type and/or source IP address. Specifically, traffic based on particular protocol types is classified and parsed. Traffic is then sent from the smart router 250 via the VPN server 310 through one or more connected physical networks 270, e.g., ISPs. In other words, each established physical network connection will have dynamically routed traffic travelling across logical links to a particular destination such as the Internet 350.

Figure 4:
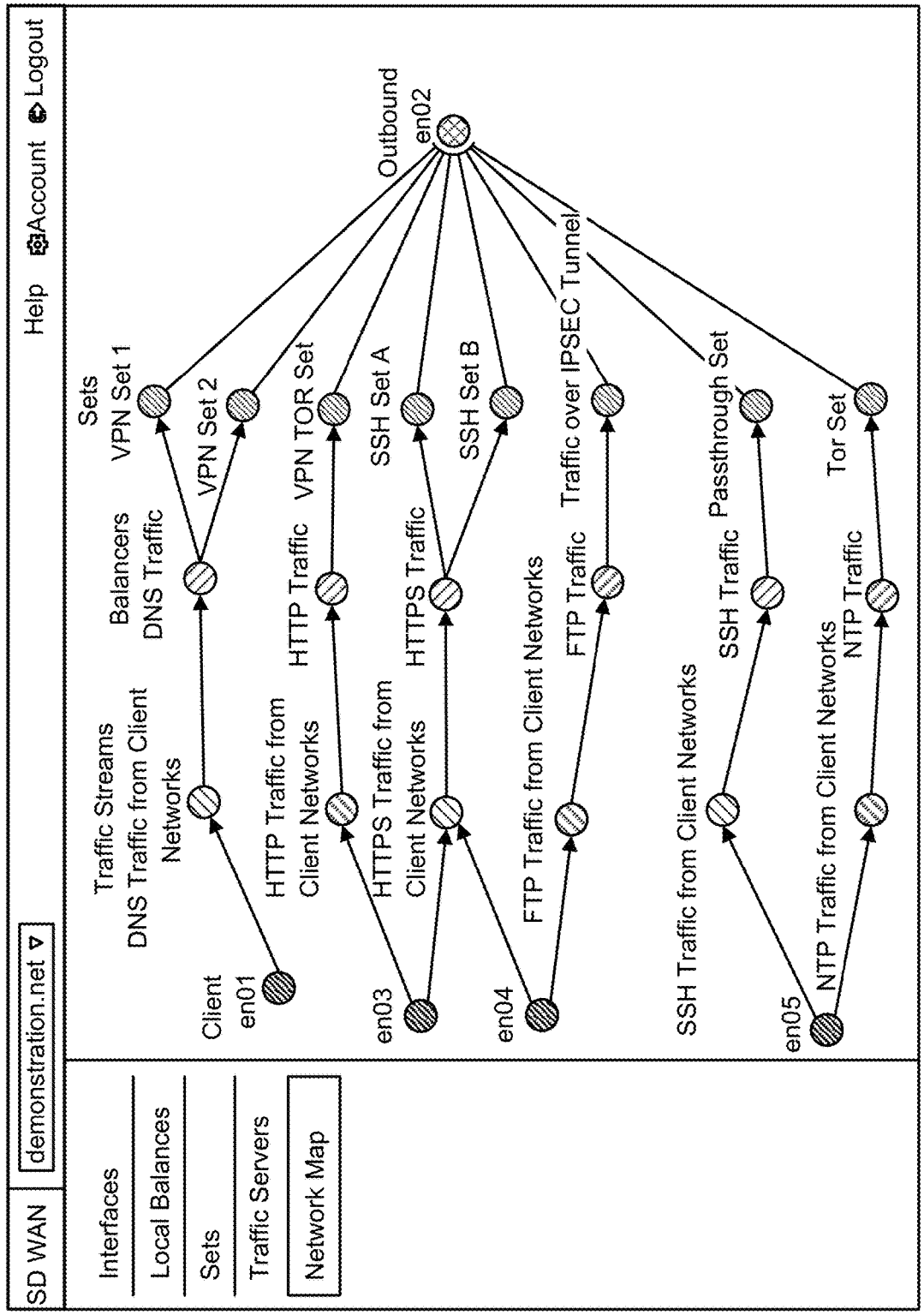
FIG. 4 illustrates an administrative user interface (UI) of the architecture in FIG. 2 according to an aspect of the application.

FIG. 4 illustrates a detailed schematic of how network traffic is sorted by the smart gateway according to an embodiment. In this exemplary embodiment, four clients—en01, en03, en04, en05—on the local network transmit traffic to the smart gateway represented by the furthest left group of circles.

Upon receiving traffic from the plural users/clients, the smart gateway determines and parses a protocol type of the received traffic from all clients as represented by the group of second most left circles. As shown the protocol type of the traffic may include but is not limited to DNS, HTTP, HTTPS, FTP, SSH and NTP. Specifically, traffic from en01 is entirely DNS traffic. Traffic from en03 includes HTTP and HTTPS traffic. Traffic from en04 include HTTPS and FTP traffic. Traffic from en05 include SSH and NTP traffic.

In an embodiment, the traffic may also be parsed by source IP address at the group of second most left circles. Additionally, at this group of second most left circles, the smart gateway evaluates whether the received traffic from at least two of the plural users/clients is associated with a particular protocol type. As depicted in FIG. 4, en03 and en04 share a common HTTPS protocol type. The smart gateway combines traffic associated with the common HTTPS.

Next, the smart gateway may perform a load balancing step. Specifically, the smart router assesses whether one or more security network protocol/servers, e.g., encrypted pathways, should support flow therethrough of the received traffic associated with the protocol type. And if more than one protocol/server is required, these servers are configured prior to exiting the smart gateway.

According to even another embodiment, each of the plural encrypted pathways for a specific protocol type may employ similar or different security network protocols. As illustrated in FIG. 4 by the group of third and fourth most left circles, DNS network traffic is split into VPN Set 1 and VPN Set 2 based on the amount of data being transmitted. Similarly, HTTPS network traffic is split into SSH Set A and SSH Set B based on the amount of data being transmitted. Meanwhile, HTTP network traffic originating from en03 is sent through a single VPN-Tor Set. FTP network Traffic originating at en04 is sent through an IPSEC Tunnel. SSH Traffic originating from en05 is sent through a Passthrough Set. Further, NTP traffic originating at en05 is sent through a Tor Set.

As further shown in FIG. 4, traffic associated with the protocol type may be transmitted from the smart gateway's exit 250b, e.g., outbound or otherwise en02, via the encrypted pathway to a particular destination. In an embodiment, the pathways may be configured to share or extend through separate physical interfaces. This may achieve controlled diversity and resiliency. The architecture may also be multi-homed. That is, the ISP may operate over cellular, fiber, copper, etc. and allow grouped pathways to be diversified across different physical communication mediums and ISPs. These configurations allow operators to coarsely and finely control spatial-temporal diversity.

As even further shown in FIG. 4, the encrypted pathway may ultimately send client traffic to a web server on the world wide web, i.e., Internet. Alternatively, the encrypted pathway may send client traffic to a cloud server connecting the home network to a satellite network with similar security credentials.

According to yet another embodiment as illustrated in FIG. 5A, an administrative dashboard on a UI 500 associated with the smart gateway is described. The right hand column of the UI illustrates plural options for an administrator to manage and evaluate the health of the network from the perspective of the smart gateway 250. Specially, the right hand column provides options to view System Status, Users, Groups, Encrypted Pathways, e.g., VPNs, and Firewalls. While the administrative dashboard indicates creation of a "New VPN," this is merely exemplary and intended only to be one embodiment of all encrypted pathways discussed in this application. In other words, other encrypted pathways described above may also be created via the dashboard shown in the UI.

The specific UI depicted in FIG. 5A may be named "Create New VPN." Different input boxes are provided for the administrator to populate information based on the specific demands of the network. The first input box allows the administrator to provide a name for the new encrypted pathway. The name provided in the first input box is "Multi-hop VPN." The second input box allows an administrator to provide a Subdomain. The next input box in allows the administrator to select a size from one or more options. As shown, the size selected is "Default."

The next option allows for the administrator to identify a scope of protection for the network. Namely, the encrypted pathway may run in either private or public mode. Private mode is the selected option in the UI. In an embodiment Private mode may be a default scope for a newly created encrypted pathway.

The next option displayed on the UI allows for the administrator to select a Type of encrypted pathway. The VPN may either be dynamic or static. And as shown in the UI, the new VPN has been selected to run in Dynamic mode. Dynamic mode maybe a default option when creating a newly encrypted pathway. Dynamic mode in the scope of the instant application may be understood to mean one or more criteria changes with respect to IP address, geography and cloud provider while network traffic is sent over the encrypted pathway.

Even another option displayed on the UI allows the administrator to determine a Rotation Period. This means the period at which one more criteria, such as IP address and geography, is changed can be customized. The UI also provides an option for the administrator to select Diffie-Hellman Rotation.

A further option displayed on the UI is to select a protocol. The protocol may either be UDP or TCP according to the particular embodiment. UDP may be a default prompt when creating a new encrypted pathway.

Yet a further option on the UI allows the administrator to select a port. As shown the port is manually inputted to be 1080. In some embodiments, this may be a default.

Yet even a further option on the UI allows the administrator to select a custom CIDR. This box is left blank in the particular embodiment.

As further shown in the UI, a cloud provider may be selected from one or more cloud providers. The cloud providers options may include but are not limited to AWS, Tor, Google, Azure Stack, and DigitalOcean. The cloud provider options may continuously be updated to keep up with new providers in the marketplace. As shown in the UI, the newly created pathway selected "Amazon" as its cloud provider.

Even a further option in the UI may be for selecting a region. Here, the region may be selected from a drop down box. As shown in FIG. 5A, North America was selected as the region. During rotation, the region may be changed to another region, such as for example, South America, Africa, Middle East, Europe, East Asia, South Asia, and Australia.

Still in even a further embodiment, the UI provides a drop down box to select a Data Center. As shown, the Data Center was selected to be US-West: 1.

According to another embodiment, the UI 550 depicted in FIG. 5B may also include the ability to add one or more hops. Adding hops enhances network security by further obfuscating network traffic. Indeed, the hops may have dynamic functionality at least regarding IP address and geography. For example, each hop may employ a different security network protocol. It is also envisaged according to the instant application that each hop may include a different cloud provider. It is further envisaged according to the instant application that each hop may include a different geography or frequency.

As further shown in FIG. 5B, a prompt box option is provided to delete the hop if one is not necessary. The information for populating the hop is similar to the information for populating the VPN. That is, Hop #1 requires populating boxes associated with name, subdomain, size, scope, type, rotation, Differ-Hellman rotation, protocol, port, custom CIDR, cloud provider, region, and data center.

Further, two prompt boxes are provided at the bottom of the UI as depicted in FIG. 5B. One prompt box may be "Add VPN Hop" otherwise known to add an encrypted pathway. Another prompt box is "Create" which allows the administrator to add the encrypted pathway with or without one or more hops. As described above, the specific encrypted pathway is intended for a particular protocol type being operable and configured to support network traffic flowing therethrough to a destination.

In addition, the architecture shown in FIG. 5B integrates an Internet privacy solution based on a software platform that enables programmable creation and management of network security protocols. This capability, along with the diversified network routing behavior, creates constantly changing paths through the network and points of presence that can be automatically and dynamically scaled based on specific needs.

These form-factors enable gateway operators to take varying configuration approaches that leverage different instance types and respective deployment locations. Deployment configurations that integrate these various supported form-factors can be created to augment, and further obfuscate communications across the Internet. Such configurations can also be used to create a layered solution that is more resilient with regard to support, sustainment, and operations. The ability to integrate several deployments helps ensure mission readiness.

FIG. 6 illustrates an exemplary embodiment of another administrative dashboard UI 600 for managing encrypted pathways. Once one or more encrypted pathways, e.g., VPN servers as depicted, has been created, it will appear on the UI. As shown, there are plural encrypted pathways appearing in the UI in column format. The appearance of the plural encrypted pathways may be customized to present relevant information to the administrator and may be color coded.

As illustrated in the right-most column are names of the encrypted pathways. These include MultiHop TPN, Multi Hop VPN Hop #1, Set A, Set B, Set C, Set D, Set E, Test Hops, Test Hops Hop #1, Test Hops #2.

The next column over describes a state of the encrypted pathway. The next column over provides a state. The next column over provides a pathway address. The next column over provides a host name. The next column over provides Geography. Additional options for each encrypted pathway may also appear and may be customized by the user.

As further shown in FIG. 6, in the second most right column is a Running State of one or more of the encrypted pathways. Meanwhile, other encrypted pathways are in a Stopped state.

Regarding the address, the administrator may see both a public and private IP address for each of the encrypted pathways.

As further depicted in FIG. 6, located just above the encrypted pathway names, is one or more prompt boxes permitting the administrator to Create a VPN, e.g., FIGS. 5-5A, Rotate one or more VPNs, Stop service for one or more VPNs, and Start service for one or more VPNs. The option for rotation of VPN servers may be configured to rotate dynamically across varied cloud providers, geographies and frequencies. In a typical configuration, tens or hundreds of VPNs may be employed. The number of VPNs may be scaled up according to the needs of the administrators. The VPNs may be rotated hourly or customized according to a preset frequency.

According to another embodiment, FIG. 7 illustrates an administrative dashboard UI 700 displaying a status of the VPN servers. As shown, en01 and en04 are connected with an indication of "good." This means the VPN is operating in good health.

According to even another embodiment, FIG. 8 shows an administrative dashboard UI 800 displaying testing of one or more VPNs. As shown in the UI, one of the tests is performed on Static-UDP-secure-tunnel test. Another one of the tests is performed on TCP VPN for testing. The UI provides a prompt box to stop testing and to display the client.

Figure 9:
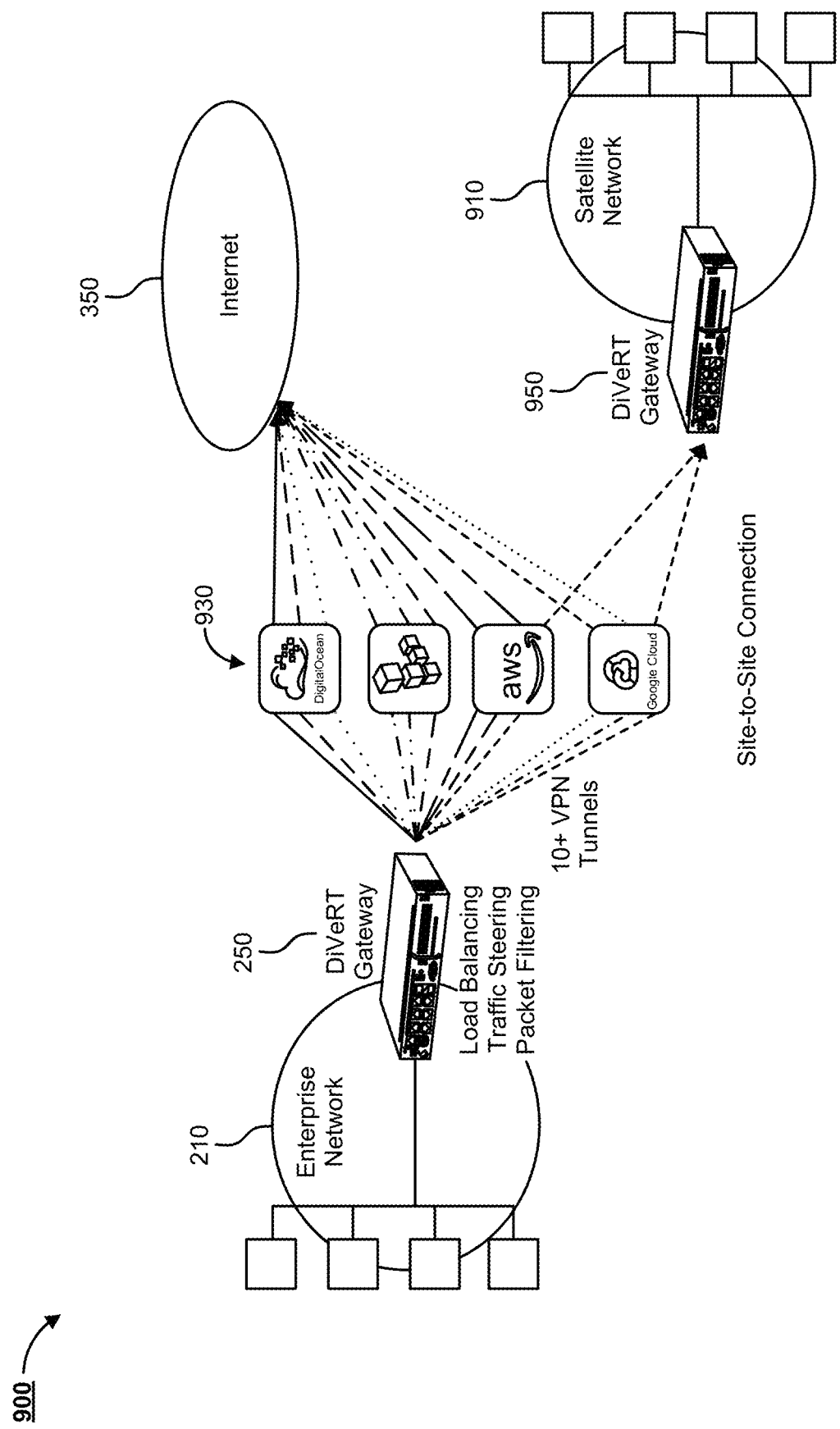
FIG. 9 illustrates an architecture of an network communicating with a satellite network via one or more encrypted pathways according to an aspect of the application.

According to a further aspect of the application, the system architecture 900 of FIG. 9 illustrates plural networks are connected and in communication with one another via one or more encrypted pathways over one or more cloud servers 910. Here, at least two smart gateways 250, 950, communicate with one another. Namely, the smart gateway 250 communicates with the network 210 and performs traffic diversification and load balancing as described above in detail with regard to FIGS. 2-5A. Network traffic flows through the smart gateway 250 via one or more encrypted pathways and via one or more cloud servers. The network traffic may reach its destination via a satellite smart gateway 950 communicating with clients in a satellite network 910.

Figure 10A:
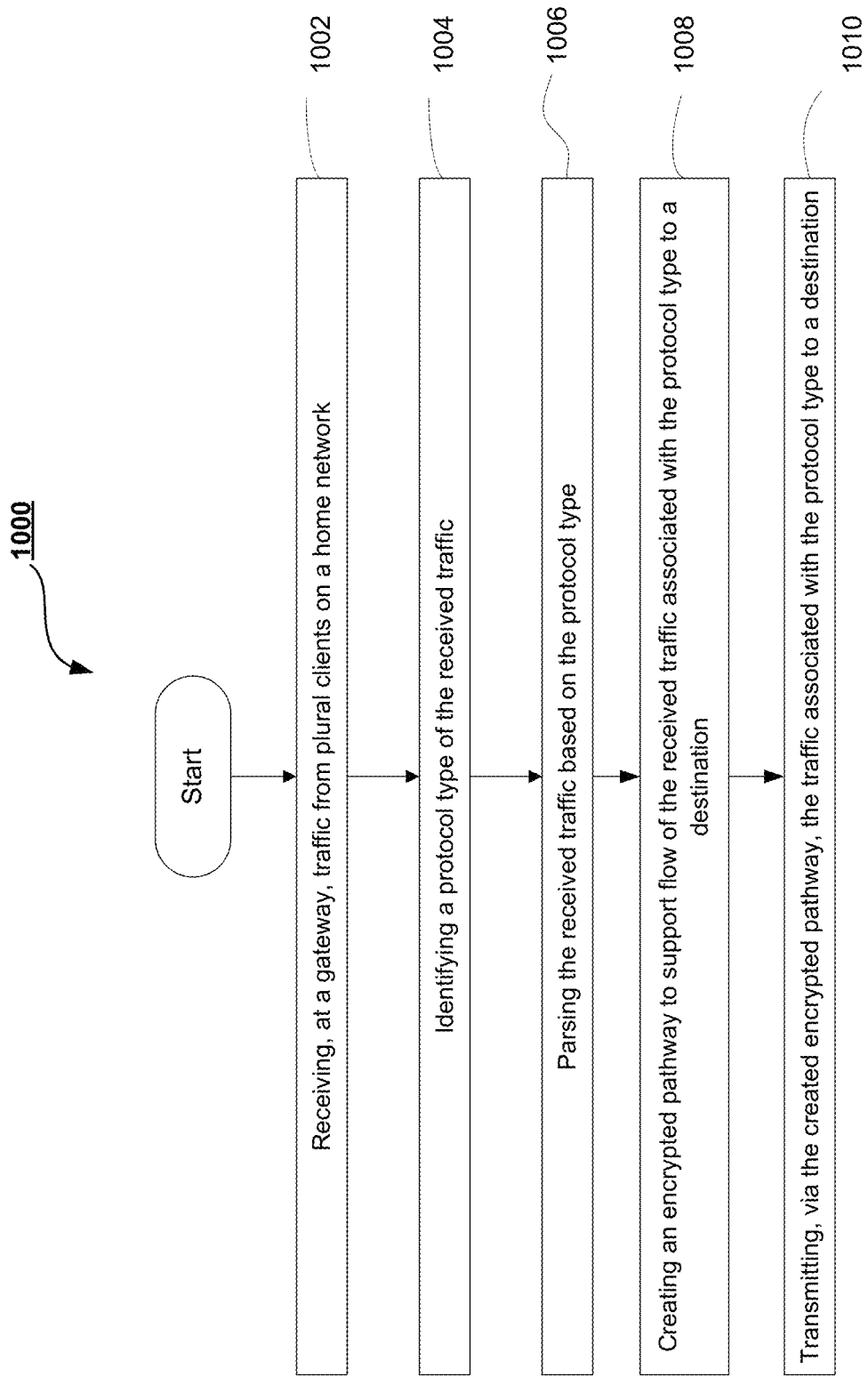
FIG. 10A illustrates a flow depicting functionality to obfuscate network traffic in a multi-hop network according to an aspect of the application.

Still yet another aspect of the application describes a method or algorithm 1000 which may be deployed via a system for obfuscating traffic as illustrated in FIG. 10A. Step 1002 may include receiving, at a gateway, traffic from plural clients on a home network. Step 1004 may include identifying a protocol type of the received traffic. Step 1006 may include parsing the received traffic based on the protocol type. Step 1008 may include creating an encrypted pathway to support flow of the received traffic associated with the protocol type to a destination. Further, Step 1008 may include transmitting, via the created encrypted pathway, the traffic associated with the protocol type to a destination.

Figure 10B:
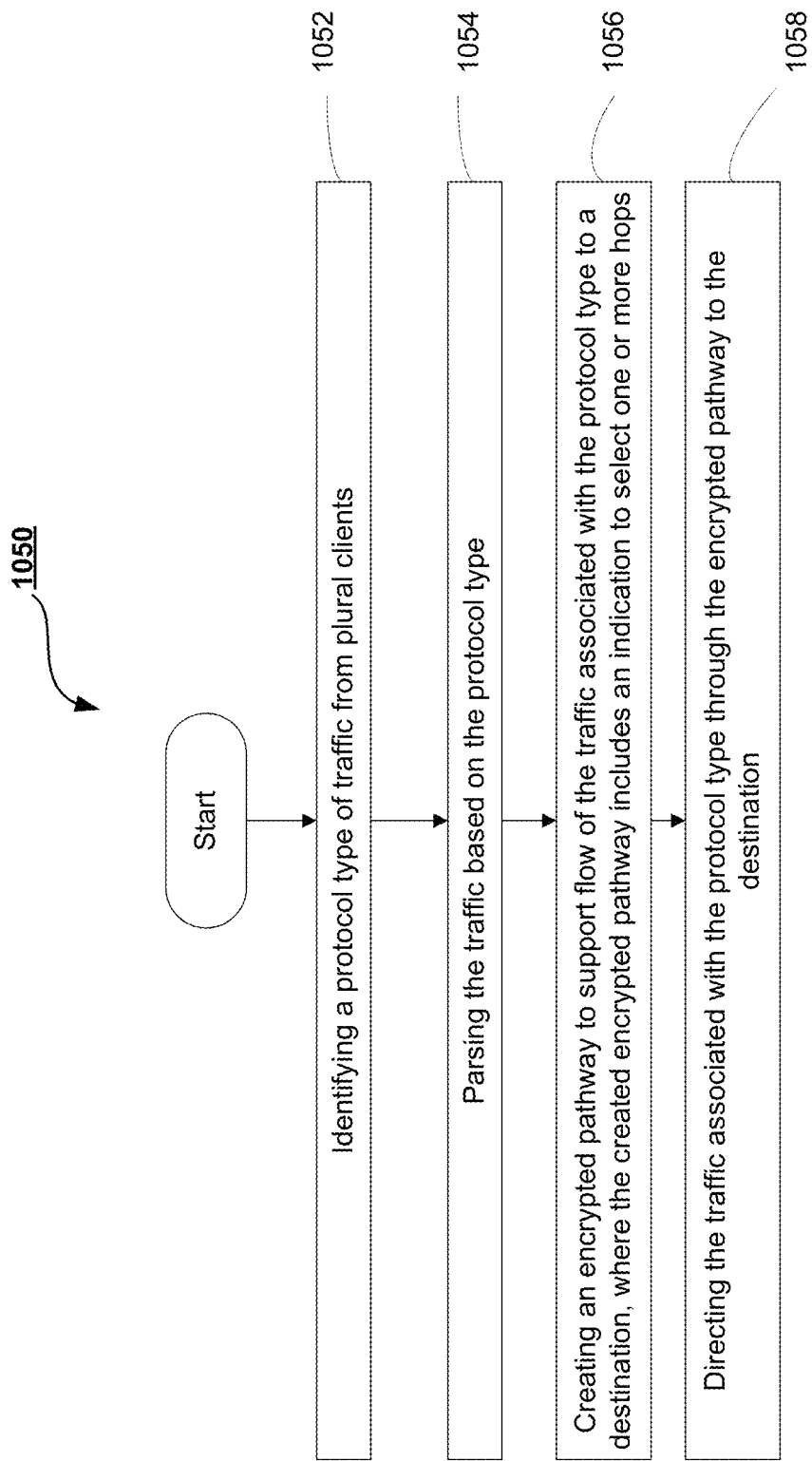
FIG. 10B illustrates another flow depicting functionality to obfuscate network traffic in a multi-hop network according to an aspect of the application.

Yet even another aspect of the application describes a method or algorithm 1050 which may be deployed via a system for obfuscating traffic as illustrated in FIG. 10B. Step 1052 may include identifying a protocol type of traffic from plural clients. Step 1054 may include parsing the traffic based on the protocol type. Step 1056 may include creating an encrypted pathway to support flow of the traffic associated with the protocol type to a destination, where the created encrypted pathway includes an indication to select one or more hops. Step 1058 may include directing the traffic associated with the protocol type through the encrypted pathway to the destination.

Figure 11:
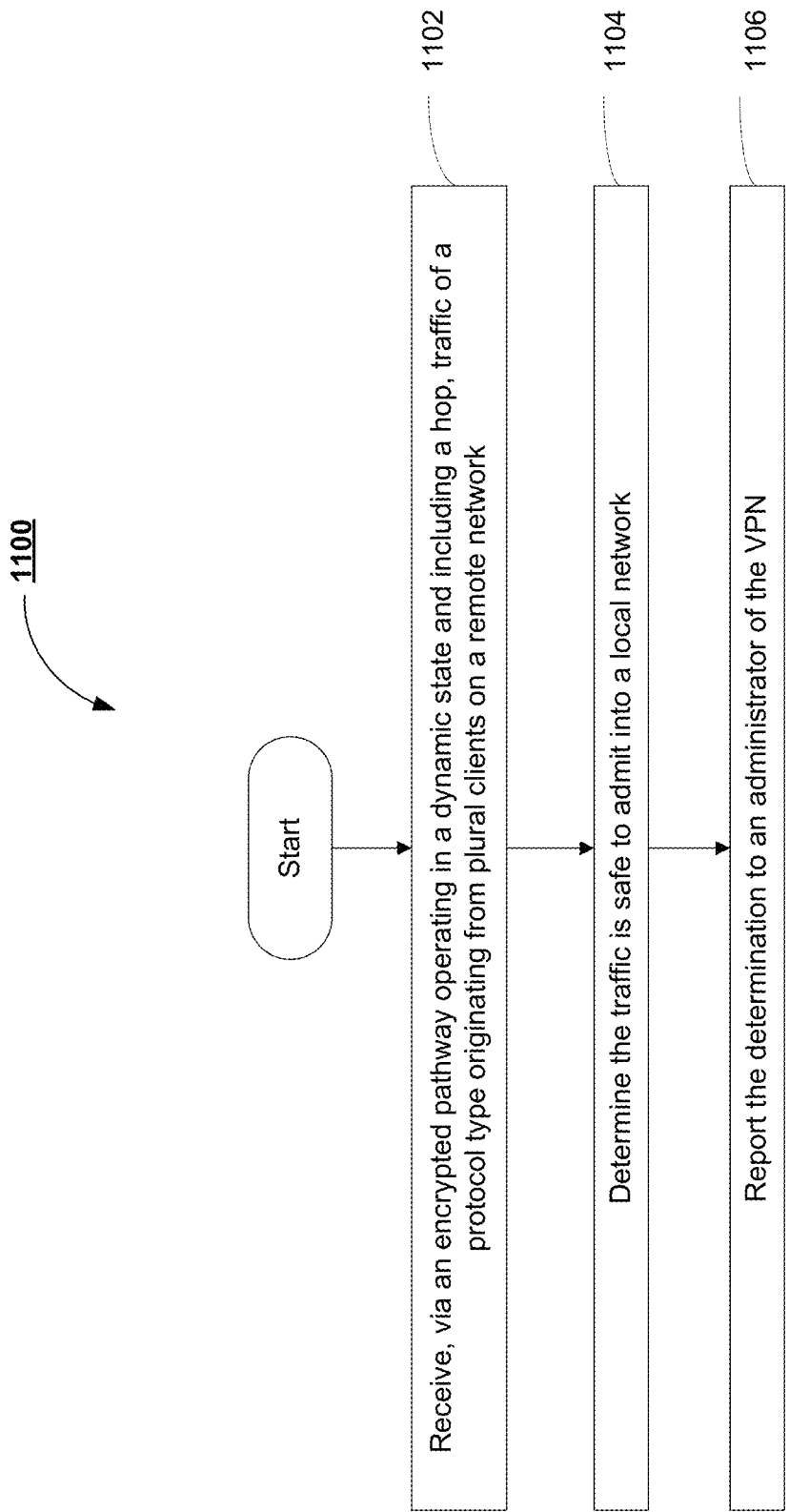
FIG. 11 illustrates even another flow depicting functionality to obfuscate network traffic in a multi-hop network according to another aspect of the application.

Yet even a further aspect of the application describes a method or algorithm 1100 which may which cause the following actions to occur at a gateway as illustrated in FIG. 11. Step 1102 includes identifying a protocol type of traffic from plural clients. Step 1104 includes parsing the traffic based on the protocol type. Further, Step 1106 includes creating an encrypted pathway to support flow of the traffic associated with the protocol type to a destination, where the created encrypted pathway includes an indication to select one or more hops.

Network Obfuscation and Machine Learning

In even another aspect of the application, a network built for obfuscation and privacy is described. The network requires a different approach from traditional network defenses. According to this aspect, it may be desired to quickly deduce whether the network is being probed by a third party. Since probing may occur in both active and covert ways, it is important to understand who and what information is being sought about multi-hop network activity and nodes therein.

Figure 12:
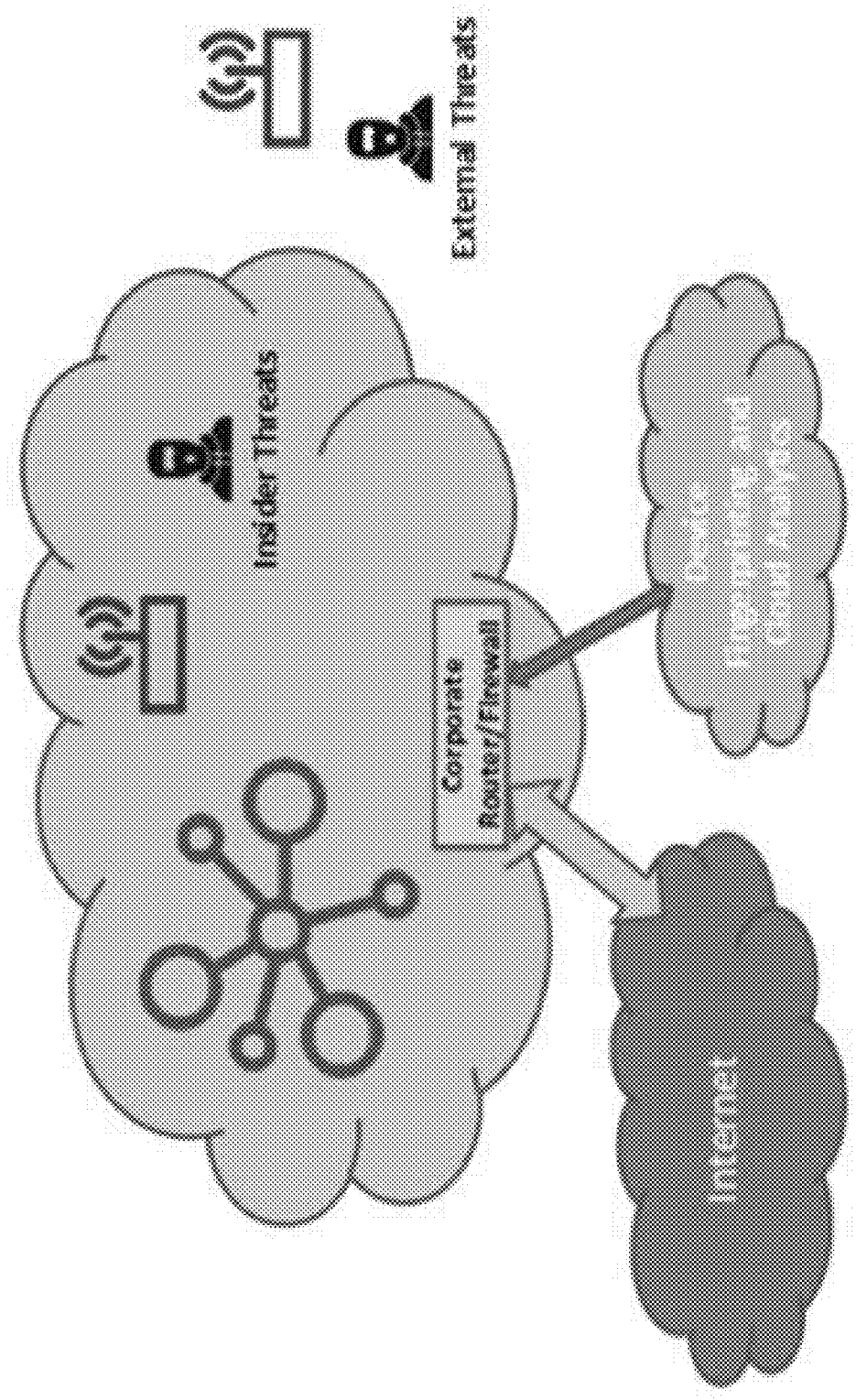
FIG. 12 illustrates a threat detection architecture in a multi-hop network.

According to an embodiment, a wireless threat landscape is depicted in FIG. 12. Specifically, the threats may come from either inside or outside of the network. Outside threats may include rogue Wi-Fi (or cellular) threats. The rogue threat may occur via a man-in-the-middle (MITM) attack whereby the attacker secretly relays and possibly alters the communication between two parties who believe they are directly communicating with each other. One example is active eavesdropping, in which the attacker makes independent connections with the victims and relays messages between them to make them believe they are talking directly to each other over a private connection. Unfortunately, the conversation is controlled by the attacker. The attacker must be able to intercept all relevant messages passing between the two victims and inject new ones.

Figure 13:
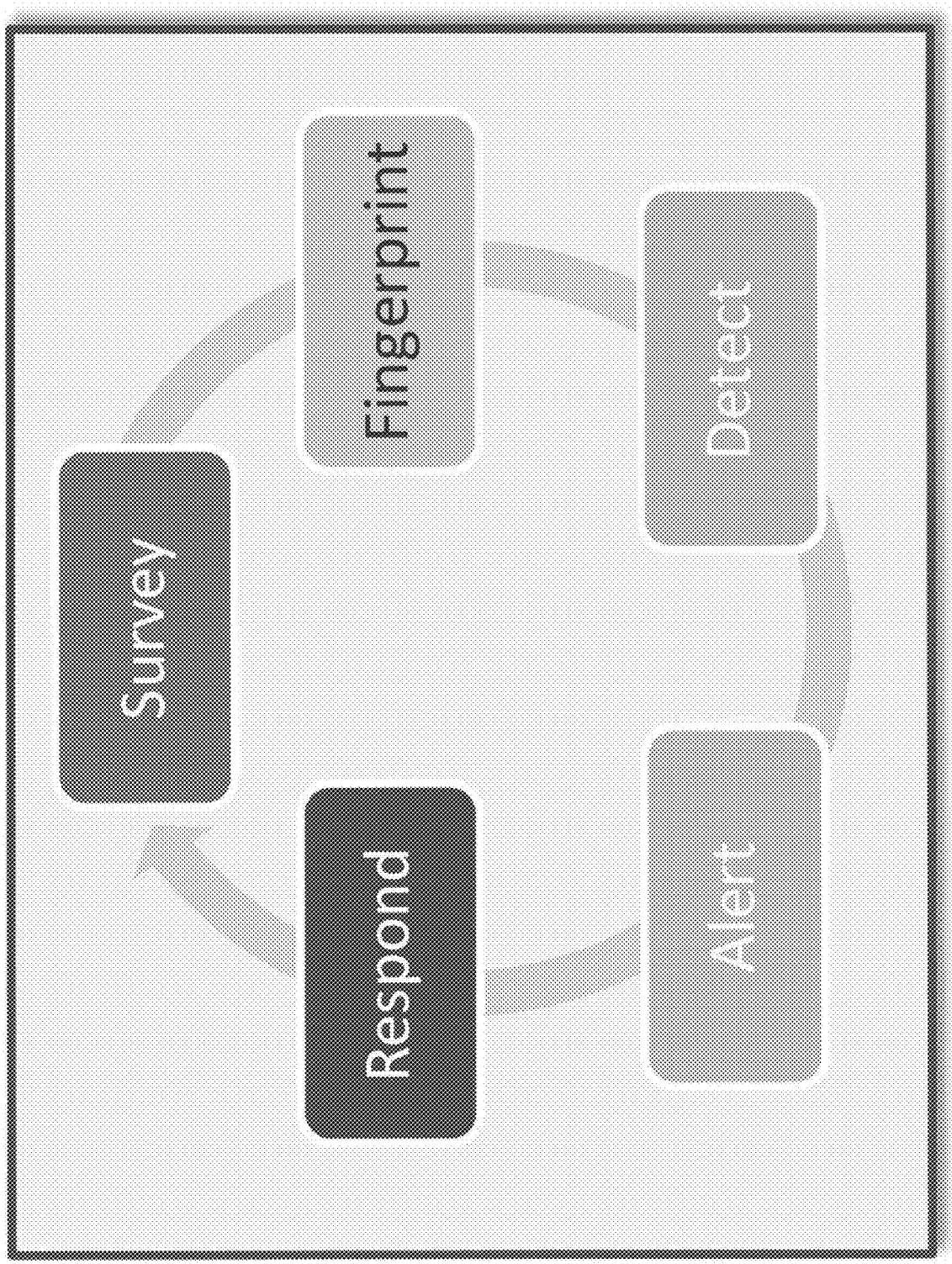
FIG. 13 illustrates a threat monitoring cycle for determining a probe from a third party in a multi-hop network.

According to yet another embodiment, FIG. 13 illustrates a general flow for a detection and identification software application. Moving clockwise beginning at noon in FIG. 13, the software application persistently surveys, analyzes, and fingerprints network traffic. The system may use unsupervised or supervised machine learning detection algorithms to flag anomalous traffic. Upon detection, the application alerts the administrator with a variety of configurable notification options, such as push alerts to a browser. After detecting anomalous activity, the software application may respond by with appropriate mitigation techniques.

According to yet even another embodiment, heuristic and machine learning techniques may be employed to evaluate, determine, and flag determined probes of traffic sent by third parties to nodes/clients in the multi-hop network. The determination of the probe from the sent traffic helps a network administrator plan for securing confidential and valuable information. It is envisaged in the application that purposeful, consistent and organized interrogation of probes identified by the trained machine learning model may improve network security technology.

According to an exemplary embodiment, an input to train the machine learning model may stem from past traffic 180 received via third parties communicating with the multi-hop network. Another input to train the machine learning model may stem from past traffic 180 received via third parties communicating with another multi-hop network. The past traffic 180 may be evaluated for specific attributes, i.e., model parameters, indicative of a red flag. For example, identifying the same IP address sending pings or requests to the nodes on the network may be an identifying attribute. Moreover, inbound requests from VPNs and other public obfuscation networks may be an identifying attribute. Further, if the requests originate from the same privacy provider network. Even further, the source geography of the probes being similar may be an identifying attribute. That is, whether probes come from the same country or from wholly unrelated countries Yet even a further identifying attribute may be whether probes have the same cadence.

Figure 14:
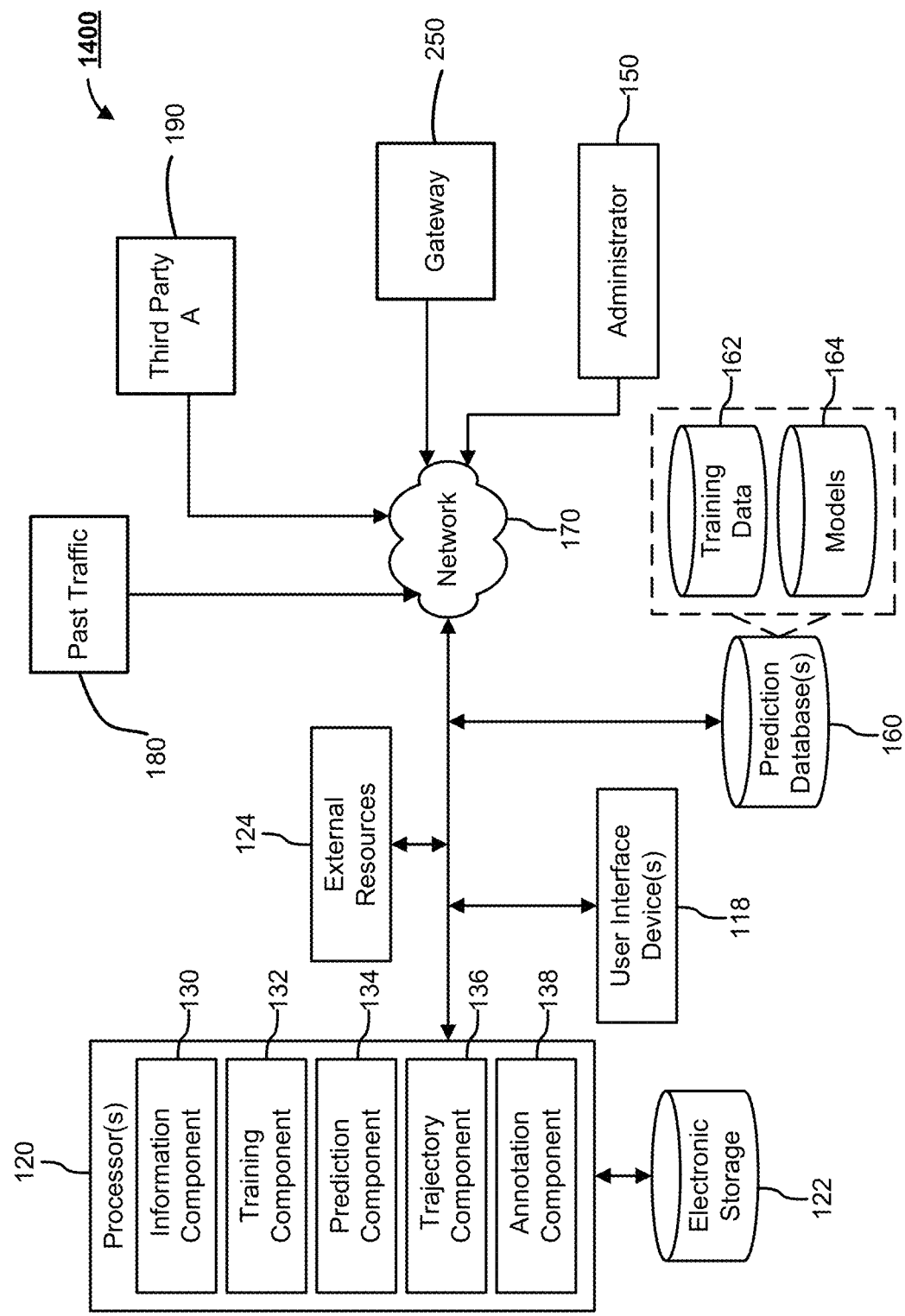
FIG. 14 illustrates a machine learning model for determining a probe seeking to obtain information about a multi-hop network according to an aspect of the application.

As envisaged in the application, and particularly in regard to the machine learning model shown in the exemplary embodiment in FIG. 14, the terms artificial neural network (ANN) and neural network (NN) may be used interchangeably. An ANN may be configured to determine a classification (e.g., type of probe) based on identified information. An ANN is a network or circuit of artificial neurons or nodes, and it may be used for predictive modeling. The prediction models may be and/or include one or more neural networks (e.g., deep neural networks, artificial neural networks, or other neural networks), other machine learning models, or other prediction models.

Disclosed implementations of ANNs may apply a weight and transform the input data by applying a function, where this transformation is a neural layer. The function may be linear or, more preferably, a nonlinear activation function, such as a logistic sigmoid, Tanh, or ReLU function. Intermediate outputs of one layer may be used as the input into a next layer. The neural network through repeated transformations learns multiple layers that may be combined into a final layer that makes predictions. This training (i.e., learning) may be performed by varying weights or parameters to minimize the difference between predictions and expected values. In some embodiments, information may be fed forward from one layer to the next. In these or other embodiments, the neural network may have memory or feedback loops that form, e.g., a neural network. Some embodiments may cause parameters to be adjusted, e.g., via back-propagation.

An ANN is characterized by features of its model, the features including an activation function, a loss or cost function, a learning algorithm, an optimization algorithm, and so forth. The structure of an ANN may be determined by a number of factors, including the number of hidden layers, the number of hidden nodes included in each hidden layer, input feature vectors, target feature vectors, and so forth. Hyperparameters may include various parameters which need to be initially set for learning, much like the initial values of model parameters. The model parameters may include various parameters sought to be determined through learning. In an exemplary embodiment, hyperparameters are set before learning and model parameters can be set through learning to specify the architecture of the ANN.

Learning rate and accuracy of an ANN rely not only on the structure and learning optimization algorithms of the ANN but also on the hyperparameters thereof. Therefore, in order to obtain a good learning model, it is important to choose a proper structure and learning algorithms for the ANN, but also to choose proper hyperparameters.

The hyperparameters may include initial values of weights and biases between nodes, mini-batch size, iteration number, learning rate, and so forth. Furthermore, the model parameters may include a weight between nodes, a bias between nodes, and so forth.

In general, the ANN is first trained by experimentally setting hyperparameters to various values. Based on the results of training, the hyperparameters can be set to optimal values that provide a stable learning rate and accuracy.

A convolutional neural network (CNN) may comprise an input and an output layer, as well as multiple hidden layers. The hidden layers of a CNN typically comprise a series of convolutional layers that convolve with a multiplication or other dot product. The activation function is commonly a ReLU layer and is subsequently followed by additional convolutions such as pooling layers, fully connected layers and normalization layers, referred to as hidden layers because their inputs and outputs are masked by the activation function and final convolution.

The CNN computes an output value by applying a specific function to the input values coming from the receptive field in the previous layer. The function that is applied to the input values is determined by a vector of weights and a bias (typically real numbers). Learning, in a neural network, progresses by making iterative adjustments to these biases and weights. The vector of weights and the bias are called filters and represent particular features of the input (e.g., a particular shape).

In some embodiments, the learning of models 164 may be of reinforcement, supervised, semi-supervised, and/or unsupervised type. For example, there may be a model for certain predictions that is learned with one of these types but another model for other predictions may be learned with another of these types.

Supervised learning is the machine learning task of learning a function that maps an input to an output based on example input-output pairs. It may infer a function from labeled training data comprising a set of training examples. In supervised learning, each example is a pair consisting of an input object (typically a vector) and a desired output value (the supervisory signal). A supervised learning algorithm analyzes the training data and produces an inferred function, which can be used for mapping new examples. And the algorithm may correctly determine the class labels for unseen instances.

Unsupervised learning is a type of machine learning that looks for previously undetected patterns in a dataset with no pre-existing labels. In contrast to supervised learning that usually makes use of human-labeled data, unsupervised learning does not via principal component (e.g., to preprocess and reduce the dimensionality of high-dimensional datasets while preserving the original structure and relationships inherent to the original dataset) and cluster analysis (e.g., which identifies commonalities in the data and reacts based on the presence or absence of such commonalities in each new piece of data).

Semi-supervised learning makes use of supervised and unsupervised techniques described above. The supervised and unsupervised techniques may be split evenly for semi-supervised learning. Alternatively, semi-supervised learning may involve a certain percentage of supervised techniques and a remaining percentage involving unsupervised techniques.

Models 164 may analyze made predictions against a reference set of data called the validation set. In some use cases, the reference outputs resulting from the assessment of made predictions against a validation set may be provided as an input to the prediction models, which the prediction model may utilize to determine whether its predictions are accurate, to determine the level of accuracy or completeness with respect to the validation set, or to make other determinations. Such determinations may be utilized by the prediction models to improve the accuracy or completeness of their predictions. In another use case, accuracy or completeness indications with respect to the prediction models' predictions may be provided to the prediction model, which, in turn, may utilize the accuracy or completeness indications to improve the accuracy or completeness of its predictions with respect to input data. For example, a labeled training dataset may enable model improvement. That is, the training model may use a validation set of data to iterate over model parameters until the point where it arrives at a final set of parameters/weights to use in the model.

In some embodiments, training component 132 in the architecture 1400 illustrated in FIG. 14 may implement an algorithm for building and training one or more deep neural networks. A used model may follow this algorithm and already be trained on data. In some embodiments, training component 132 may train a deep learning model on training data 162 providing even more accuracy after successful tests with these or other algorithms are performed and after the model is provided a large enough dataset.

In an exemplary embodiment, a model implementing a neural network may be trained using training data from storage/database 162. For example, the training data obtained from prediction database 160 of FIG. 14 may comprise hundreds, thousands, or even many millions of pieces of information. The training data may also include past traffic 180 associated with the instant multi-hop network or another multi-hop network. Model parameters from the training data 162 and/or past traffic 180 may include but is not limited to: type of protocol in the traffic, source IP address, associated encrypted pathway, provider of the encrypted pathway, source geography, cadence, and content. Weights for each of the model parameters may be adjusted through training.

The training dataset may be split between training, validation, and test sets in any suitable fashion. For example, some embodiments may use about 60% or 80% of the known probes for training or validation, and the other about 40% or 20% may be used for validation or testing. In another example, training component 32 may randomly split the data, the exact ratio of training versus test data varies throughout. When a satisfactory model is found, training component 132 may train it on 95% of the training data and validate it further on the remaining 5%.

The validation set may be a subset of the training data, which is kept hidden from the model to test accuracy of the model. The test set may be a dataset, which is new to the model to test accuracy of the model. The training dataset used to train prediction models 164 may leverage, via training component 132, an SQL server and a Pivotal Greenplum database for data storage and extraction purposes.

In some embodiments, training component 132 may be configured to obtain training data from any suitable source, e.g., via prediction database 160, electronic storage 122, external resources 124, network 170, and/or UI device(s) 118. The training data may comprise, a type of protocol, source IP address, destination IP address, source and destination port numbers, associated encrypted pathway, provider of the encrypted pathway, source geography, cadence, content, time of day, etc.).

In some embodiments, training component 132 may enable one or more prediction models to be trained. The training of the neural networks may be performed via several iterations. For each training iteration, a classification prediction (e.g., output of a layer) of the neural network(s) may be determined and compared to the corresponding, known classification. For example, sensed data known to capture a closed environment comprising dynamic and/or static objects may be input, during the training or validation, into the neural network to determine whether the prediction model may properly predict probes from third parties. As such, the neural network is configured to receive at least a portion of the training data as an input feature space. As shown in FIG. 14, once trained, the model(s) may be stored in database/storage 164 of prediction database 160 and then used to classify received probes from third parties Electronic storage 122 of FIG. 14 comprises electronic storage media that electronically stores information. The electronic storage media of electronic storage 122 may comprise system storage that is provided integrally (i.e., substantially non-removable) with a system and/or removable storage that is removably connectable to a system via, for example, a port (e.g., a USB port, a firewire port, etc.) or a drive (e.g., a disk drive, etc.). Electronic storage 122 may be (in whole or in part) a separate component within the system, or electronic storage 122 may be provided (in whole or in part) integrally with one or more other components of a system (e.g., a user interface (UI) device 118, processor 121, etc.). In some embodiments, electronic storage 122 may be located in a server together with processor 121, in a server that is part of external resources 124, in UI devices 118, and/or in other locations. Electronic storage 122 may comprise a memory controller and one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Electronic storage 122 may store software algorithms, information obtained and/or determined by processor 121, information received via UI devices 118 and/or other external computing systems, information received from external resources 124, and/or other information that enables system to function as described herein.

External resources 124 may include sources of information (e.g., databases, websites, etc.), external entities participating with a system, one or more servers outside of a system, a network, electronic storage, equipment related to Wi-Fi technology, equipment related to Bluetooth® technology, data entry devices, a power supply (e.g., battery powered or line-power connected, such as directly to 110 volts AC or indirectly via AC/DC conversion), a transmit/receive element (e.g., an antenna configured to transmit and/or receive wireless signals), a network interface controller (NIC), a display controller, a graphics processing unit (GPU), and/or other resources. In some implementations, some or all of the functionality attributed herein to external resources 124 may be provided by other components or resources included in the system. Processor 121, external resources 124, UI device 118, electronic storage 122, a network, and/or other components of the system may be configured to communicate with each other via wired and/or wireless connections, such as a network (e.g., a local area network (LAN), the Internet, a wide area network (WAN), a radio access network (RAN), a public switched telephone network (PSTN), etc.), cellular technology (e.g., GSM, UMTS, LTE, 5G, etc.), Wi-Fi technology, another wireless communications link (e.g., radio frequency (RF), microwave, infrared (IR), ultraviolet (UV), visible light, cm wave, mm wave, etc.), a base station, and/or other resources.

UI device(s) 118 of the system may be configured to provide an interface between one or more clients/users and the system. The UI devices 118 may include client devices such as computers, tablets and smart devices. The UI devices 118 may also include the administrative dashboard 150 and/or smart gateway 250. UI devices 118 are configured to provide information to and/or receive information from the one or more users/clients 118. UI devices 118 include a UI and/or other components. The UI may be and/or include a graphical UI configured to present views and/or fields configured to receive entry and/or selection with respect to particular functionality of the system, and/or provide and/or receive other information. In some embodiments, the UI of UI devices 118 may include a plurality of separate interfaces associated with processors 121 and/or other components of the system. Examples of interface devices suitable for inclusion in UI device 118 include a touch screen, a keypad, touch sensitive and/or physical buttons, switches, a keyboard, knobs, levers, a display, speakers, a microphone, an indicator light, an audible alarm, a printer, and/or other interface devices. The present disclosure also contemplates that UI devices 118 include a removable storage interface. In this example, information may be loaded into UI devices 118 from removable storage (e.g., a smart card, a flash drive, a removable disk) that enables users to customize the implementation of UI devices 118.

In some embodiments, UI devices 118 are configured to provide a UI, processing capabilities, databases, and/or electronic storage to the system. As such, UI devices 118 may include processors 121, electronic storage 122, external resources 124, and/or other components of the system. In some embodiments, UI devices 118 are connected to a network (e.g., the Internet). In some embodiments, UI devices 118 do not include processor 121, electronic storage 122, external resources 124, and/or other components of system, but instead communicate with these components via dedicated lines, a bus, a switch, network, or other communication means. The communication may be wireless or wired. In some embodiments, UI devices 118 are laptops, desktop computers, smartphones, tablet computers, and/or other UI devices on the network.

Data and content may be exchanged between the various components of the system through a communication interface and communication paths using any one of a number of communications protocols. In one example, data may be exchanged employing a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose, the Internet Protocol (IP) defines addressing methods and structures for datagram encapsulation. Of course, other protocols also may be used. Examples of an Internet protocol include Internet Protocol version 4 (IPv4) and Internet Protocol version 6 (IPv6).

In some embodiments, processor(s) 121 may form part (e.g., in a same or separate housing) of a user device, a consumer electronics device, a mobile phone, a smartphone, a personal data assistant, a digital tablet/pad computer, a wearable device (e.g., watch), AR goggles, VR goggles, a reflective display, a personal computer, a laptop computer, a notebook computer, a work station, a server, a high performance computer (HPC), a vehicle (e.g., embedded computer, such as in a dashboard or in front of a seated occupant of a car or plane), a game or entertainment system, a set-top-box, a monitor, a television (TV), a panel, a space craft, or any other device. In some embodiments, processor 121 is configured to provide information processing capabilities in the system. Processor 121 may comprise one or more of a digital processor, an analog processor, a digital circuit designed to process information, an analog circuit designed to process information, a state machine, and/or other mechanisms for electronically processing information. Although processor 121 is shown in FIG. 14 as a single entity, this is for illustrative purposes only. In some embodiments, processor 121 may comprise a plurality of processing units. These processing units may be physically located within the same device (e.g., a server), or processor 121 may represent processing functionality of a plurality of devices operating in coordination (e.g., one or more servers, UI devices 118, devices that are part of external resources 124, electronic storage 122, and/or other devices).

As shown in FIG. 14, processor 121 is configured via machine-readable instructions to execute one or more computer program components. The computer program components may comprise one or more of information component 131, training component 132, prediction component 134, annotation component 136, trajectory component 38, and/or other components. Processor 121 may be configured to execute components 131, 132, 134, 136, and/or 138 by: software; hardware; firmware; some combination of software, hardware, and/or firmware; and/or other mechanisms for configuring processing capabilities on processor 21.

It should be appreciated that although components 131, 132, 134, 136, and 138 are illustrated in FIG. 14 as being co-located within a single processing unit, in embodiments in which processor 121 comprises multiple processing units, one or more of components 31, 132, 134, 136, and/or 138 may be located remotely from the other components. For example, in some embodiments, each of processor components 131, 132, 134, 136, and 138 may comprise a separate and distinct set of processors. The description of the functionality provided by the different components 131, 132, 134, 136, and/or 138 described below is for illustrative purposes, and is not intended to be limiting, as any of components 131, 132, 134, 136, and/or 138 may provide more or less functionality than is described. For example, one or more of components 131, 132, 134, 136, and/or 138 may be eliminated, and some or all of its functionality may be provided by other components 131, 132, 134, 136, and/or 138. As another example, processor 121 may be configured to execute one or more additional components that may perform some or all of the functionality attributed below to one of components 131, 132, 134, 136, and/or 138.

FIG. 14 also illustrates a smart gateway 250 connected to network 170. Smart gateway 250 receives traffic from one or more third parties over the network 170. For example, Third Party A (or other Third Parties) 190 may transmit traffic to the network 170. Smart gateway 250 routes and monitors received traffic and transmits it to respective clients 118 on the local network.

Concurrently, the smart gateway 250 and/or processor 120 may employ one or more of the trained machine learning models 164 in the predication database 160, based upon the training data 162, to evaluate new probes originating from traffic sent by Third party A 190. The new probe is flagged if it is determined the probe was intended to obtain sensitive and/or confidential information about the multi-hop network or nodes located therein. The flagged probe may appear in a database of the administrator 150. The probe may also be added to a list of marked probes in the database. Another trained machine learning model 164 may be used to further evaluate threat levels of the marked probes in the database.

In an exemplary embodiment upon the probe being flagged, the type of probe and the associated third party transmitter may be blocked from communicating with clients 118. In an alternative embodiment, the smart gateway 250 and processor 120 may permit further traffic from the same third party transmitting the determined probe for a specific period of time. This may be to gain additional information about the third party or to further understand the determined protocols.

In yet another embodiment, FIG. 14 illustrates an administrator 150 connected to the network 170. Administrator 150 is also operably coupled to the gateway. Administrator 150 is able to view the monitoring, flagging, and/or updating of traffic routing policies for one or more clients/UI devices 118. Moreover, the administrator 150 may be able to create, delete and rotate encrypted pathways as described above in the application.

Figure 15:
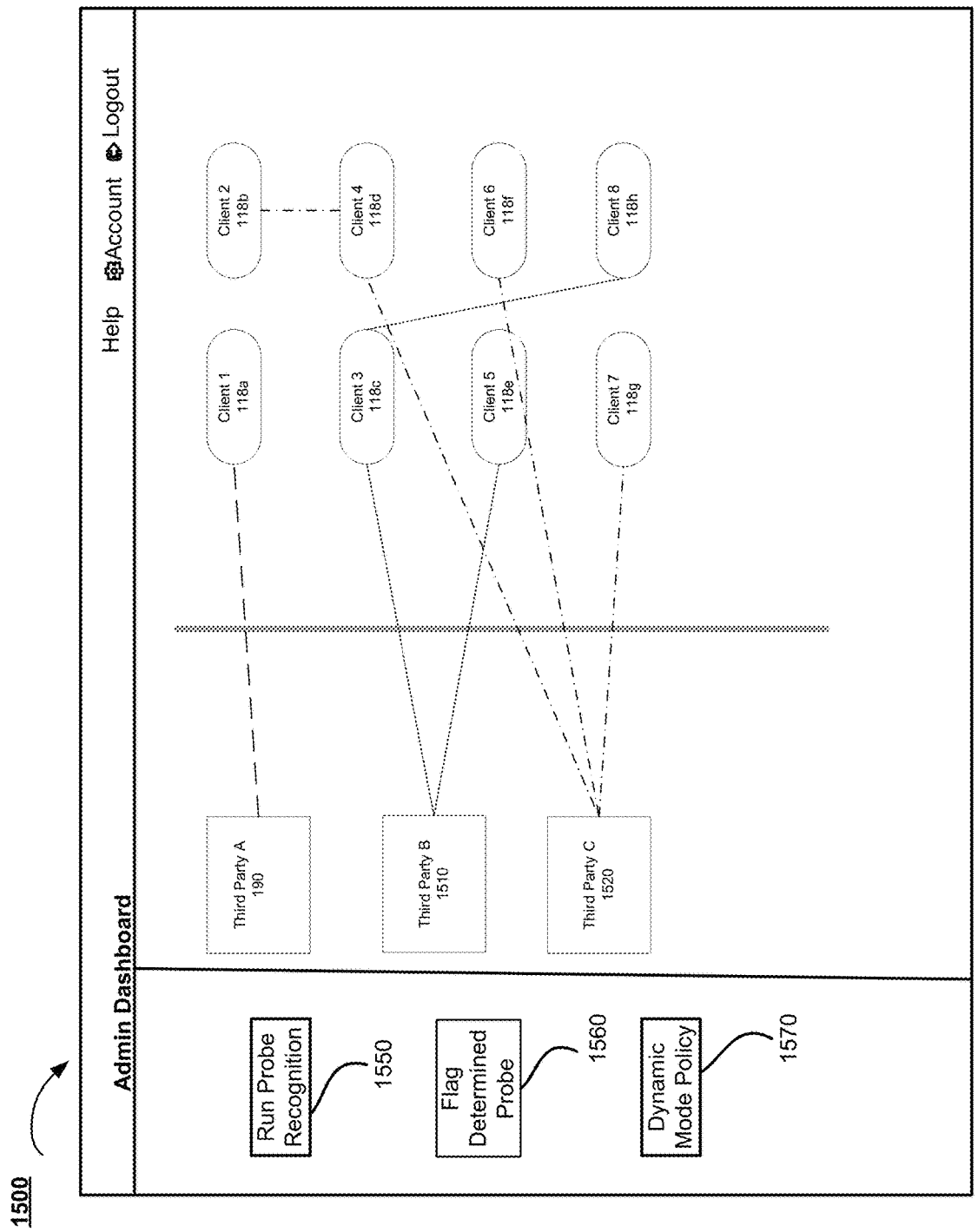
FIG. 15 illustrates an administrative UI for determining, flagging and updating policies regarding probes sent from third parties according to an aspect of the application.

According to yet a further embodiment, FIG. 15 illustrates an administrative dashboard UI 1500 to monitor, flag and update policies for determined protocols. Namely, the administrator dashboard 1500 illustrates a snapshot of sent traffic from Third party A 190, Third party B 1510, and Third party C 1520 to one or more clients 118a-h. The administrator dashboard may include a Run Probe Recognition 1550 option which is configured to overlay determined probes originating from various third party hacker tracker run through the trained machine learning model. This may be run in real-time to provide a quick snapshot of threats in the multi-hop network. The traffic, and possibly a determined probe from the trained machine learning model, originating from each third party is represented by different lines types. For example, Third party A's 190 transmitted traffic is represented by a single dashed line to client 118a. Here, the single dashed line may be representative of traffic versus a determined probe. Traffic versus a determined probe may also be varied by color, line weights or other distinctions and is envisaged according to the instant application.

Administrator dashboard 1500 illustrates a dotted line extending from Third party B 1510 to Client 3 118c and Client 5 118e. This is caused by the Run Probe Recognition 1550 option being executed by a user. In another embodiment, the UI 1500 may also be able to depict a dotted line extending from Client 3 118c to Client 8 118h. This is understood to mean that the determined probe is attempting to inferentially gain information about Client 8 118 h through communications with Client 3 118c.

In another embodiment, when then Run Probe Recognition 1550 option is not executed, the dotted line extending from Third party B 1510 may appear as a single dashed line. The UI 1500 may be configured to show only dashed lines indicating of traffic. The UI may alternatively be configured to show only dotted lines indicative of determined probes. The UI may otherwise be configured to show both dotted and dashed lines as depicted in FIG. 15.

Further in FIG. 15, Third party C's 1520 traffic is transmitted to each of Client 4 118d, Client 6 118f and Client 7 118g. The traffic is represented by a hashed-dotted line. This is understood to mean determined probe based upon traffic run through the trained machine learning model. Similar to the scenario for Third party B, Third party C may also attempt to inferentially gain information about a client via another client. Here, Third party C 1520 transmits a determined probe depicted by the hashed-dotted line to Client 4 118d. The UI 1500 illustrates the determined probe inferentially gaining information about Client 2 118b.

Even further in FIG. 15, the administrator dashboard 1500 depicts an option to Flag a Determined Probe 1560. This option allows the user to add the determined probe to a flagged database. Determined probes in a flagged database may be independently monitored. For example, if the administrator wishes to continue following activity of a particular determined probe, it may be moved to the flagged database.

As even further depicted in FIG. 15, the administrator dashboard 1500 provides an option to update a Dynamic Mode Policy 1570. The Dynamic Mode Policy may be used to prevent suspected traffic of having a probe from entering the multi-hop network. The Dynamic Mode Policy may also be used to initiate traffic monitoring policies of suspected traffic meeting one more criteria. The criteria may be based on anomalies gathered from the training data and from determined probes via the trained machine learning model. The Dynamic Mode Policy 1570 may automatically be run after a predetermined period, e.g., daily, weekly, monthly, etc., in accordance with customized inputs and/or may manually be run by the administrator.

Figure 16A:
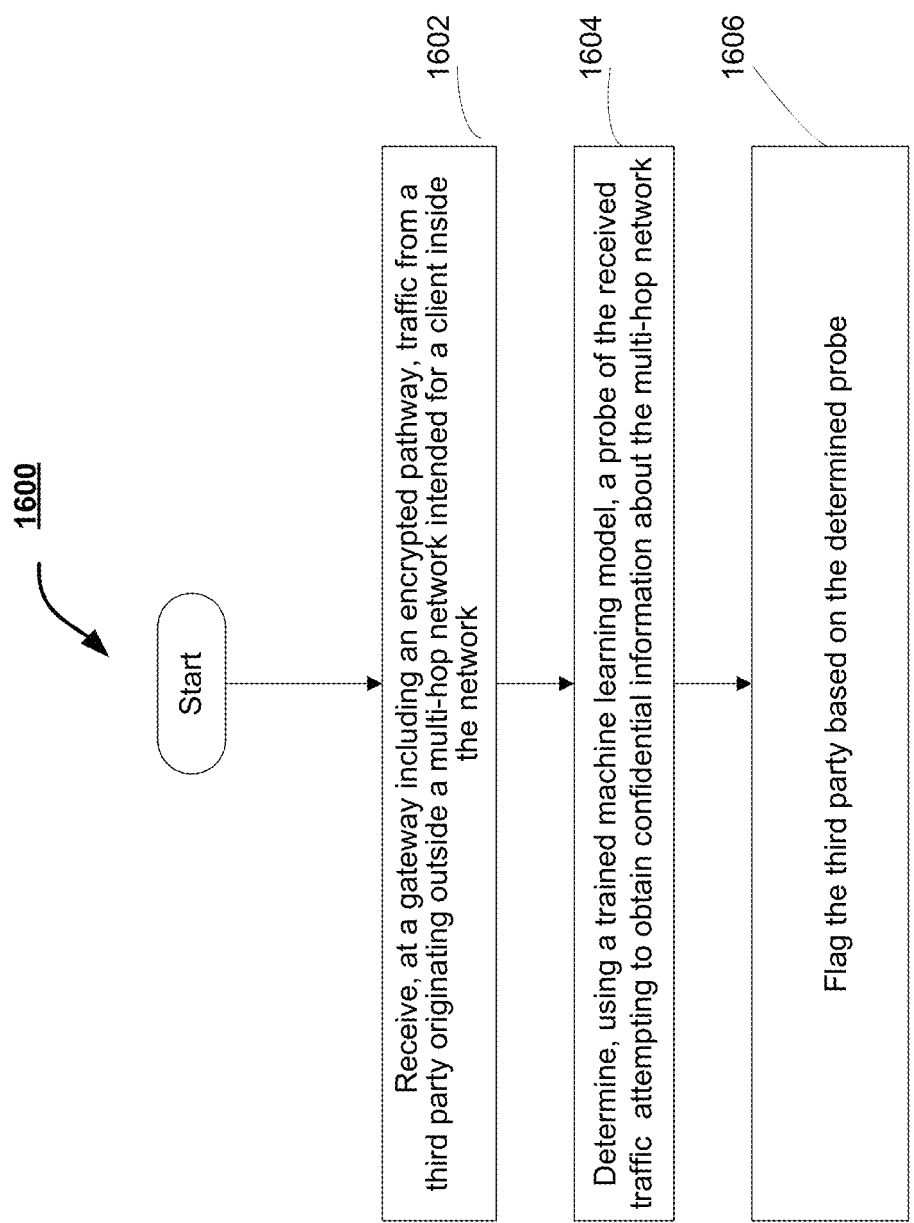
FIG. 16A illustrates a flow depicting functionality for determining a probe according to an aspect of the application.

Yet another aspect of the application describes a method or algorithm 1600 which may be deployed at a system including a gateway, or alternatively deployed remotely at another server, as illustrated in FIG. 16A. Step 1602 may include receiving, at a gateway, traffic from a third party originating outside a multi-hop network including an encrypted pathway intended for a client inside the network. Step 1604 may include determining, using a trained machine learning model, a probe of the received traffic attempting to obtain confidential information about the multi-hop network. Step 1606 may include flagging the third party based on the determined probe.

Figure 16B:
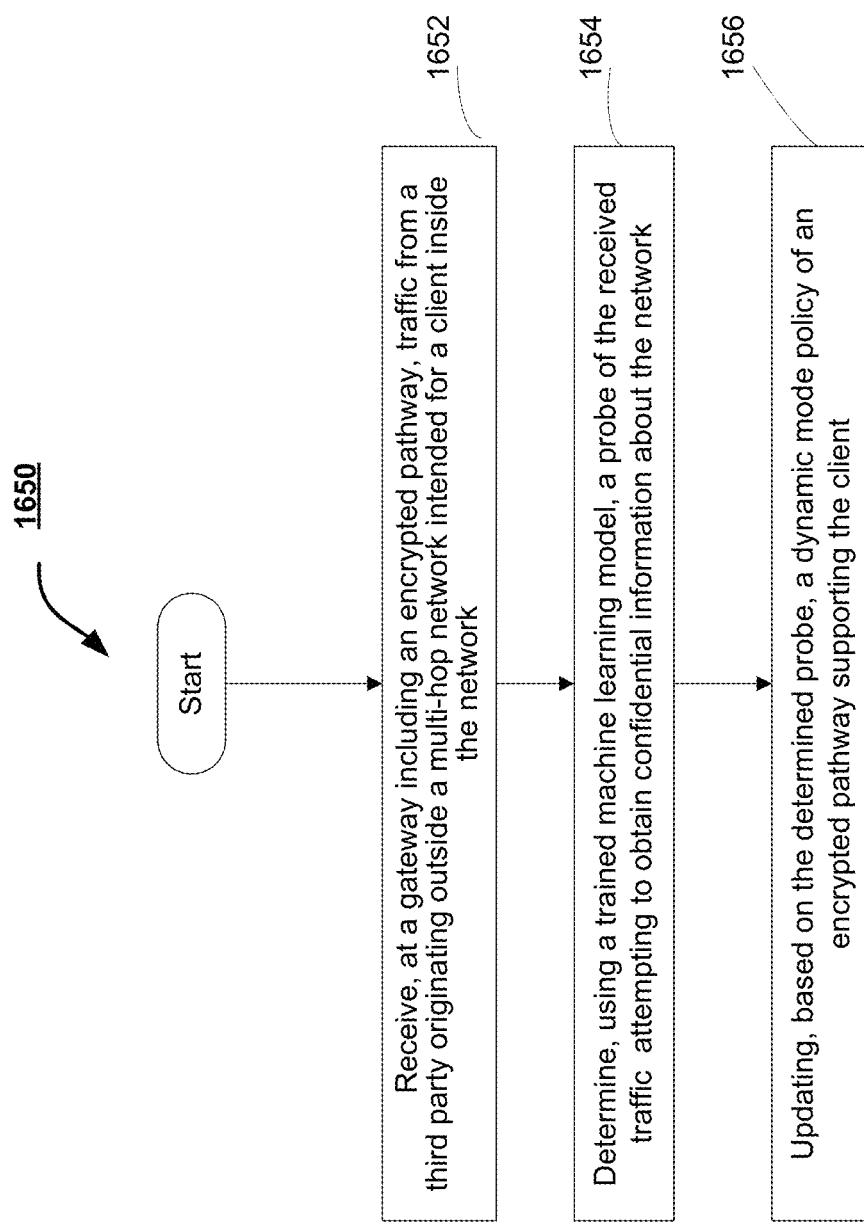
FIG. 16B illustrates another flow depicting functionality for determining a probe according to an aspect of the application.

Yet even another aspect of the application describes a method or algorithm 1650 which may be deployed at a system including a gateway, or alternatively deployed remotely at another server, as illustrated in FIG. 16B. Step 1652 may include receiving, at a gateway including an encrypted pathway, traffic from a third party originating outside a multi-hop network intended for a client inside the network. Step 1654 may include determining, via a trained machine learning model, a probe of the received traffic attempting to obtain information about the network. Step 1656 may include updating, based on the determined probe, a dynamic mode policy of an encrypted pathway supporting the client.

Yet even a further aspect of the application describes a method or algorithm 1690 which may be deployed at a system including a gateway, or alternatively deployed remotely at another server, as illustrated in FIG. 16C. Step 1692 may include receiving traffic originating outside a multi-hop network intended for a client inside the network. Step 1694 may include determining, using a trained machine learning model, a probe of the received traffic attempting to obtain information about the multi-hop network. Step 1696 may include flagging the determined probe.

While the system and method have been described in terms of what are presently considered to be specific embodiments, the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
receiving, at a gateway including an encrypted pathway, traffic from a third party originating outside a multi-hop network intended for a client inside the multi-hop network;
determining, using a trained machine learning model, a probe of the received traffic attempting to obtain confidential information about the multi-hop network;
flagging the third party based on the determined probe; and
updating, based on the determined probe, a dynamic mode policy of an encrypted pathway supporting the client,
wherein the update includes moving an IP address, geography, and cloud provider of the encrypted pathway at an instance prior to a predetermined schedule of the dynamic mode policy, and
wherein the update occurs at every node of the encrypted pathway.

2. The method of claim 1, further comprising:
obtaining training data from past traffic originating outside the multi-hop network transmitted to the network; and
training the machine learning model with the obtained training data.

3. The method of claim 1, wherein the trained machine learning model evaluates an attribute of the received traffic selected from the group consisting of: type of protocol, source IP address, associated encrypted pathway, provider of the encrypted pathway, source geography, cadence and combinations thereof.

4. The method of claim 3, wherein the machine learning model evaluates content of the received traffic.

5. The method of claim 1, further comprising:
obtaining, via a user interface, a selection configured to cause display of a representation of one or more of the determined probe, third party and intended client.

6. The method of claim 5, wherein the representation illustrates a pattern of probing another client in the multi-hop network.

7. The method of claim 1, further comprising:
transmitting the flagged/determined probe to an administrator or a gateway at a remote destination.

8. A system comprising:
a non-transitory memory including a set of instructions; and
a processor operably coupled to the non-transitory memory configured to execute the set of instructions including:
receiving, at a gateway including an encrypted pathway, traffic from a third party originating outside a multi-hop network intended for a client inside the multi-hop network;
determining, via a trained machine learning model, a probe of the received traffic attempting to obtain information about the network; and
updating, based on the determined probe, a dynamic mode policy of an encrypted pathway supporting the client,
wherein the update includes moving an IP address, geography, and cloud provider of the encrypted pathway at an instance prior to a predetermined schedule of the dynamic mode policy, and
wherein the update occurs at every node of the encrypted pathway.

9. The system of claim 8, wherein the processor is further configured to execute the instructions of
obtaining training data from past traffic originating outside the network transmitted to the network; and
training the machine learning model with the obtained training data.

10. The system of claim 8, wherein the trained machine learning model evaluates an attribute of the received traffic selected from the group consisting of: type of protocol, source IP address, associated encrypted pathway, provider of the encrypted pathway, source geography, cadence, content and combinations thereof.

11. The system of claim 8, wherein the processor is further configured to execute the instructions of:
obtaining, via a user interface, a selection configured to cause display of a representation of one or more of the determined probe, third party and intended client.

12. The system of claim 8, wherein the processor is further configured to execute the instructions of:
transmitting the flagged/determined probe to an administrator or a gateway at a remote destination.

13. A computer readable storage medium comprising executable instructions which when executed by a processor effectuates:
receiving traffic originating outside a multi-hop network intended for a client inside the multi-hop network;
determining, using a trained machine learning model, a probe of the received traffic attempting to obtain information about the multi-hop network; and
flagging the determined probe; and
updating, based on the determined probe, a dynamic mode policy of an encrypted pathway supporting the client,
wherein the update includes moving an IP address, geography, and cloud provider of the encrypted pathway at an instance prior to a predetermined schedule of the dynamic mode policy, and
wherein the update occurs at every node of the encrypted pathway.

14. The computer readable storage medium of claim 13, wherein the trained machine learning model evaluates a characteristic of the received traffic selected from the group consisting of: type of protocol, source IP address, associated encrypted pathway, provider of the encrypted pathway, source geography, cadence, content, and combinations thereof.

15. The computer readable storage medium of claim 13, which when executed by the processor further effectuates:
   obtaining, via a user interface, a selection configured to cause display of a representation of one or more of the determined probe, third party and intended client.

16. The computer readable storage medium of claim 15, wherein the representation illustrates a pattern of probing another client in the multi-hop network.

\* \* \* \* \*